US012636722B2

(12) United States Patent
Miyake et al.

(10) Patent No.: US 12,636,722 B2
(45) Date of Patent: May 26, 2026

(54) WIRE SPARK MACHINING APPARATUS AND METHOD FOR PRODUCING SEMICONDUCTOR WAFER

(71) Applicant: Mitsubishi Electric Corporation, Tokyo (JP)

(72) Inventors: Hidetaka Miyake, Tokyo (JP); Atsushi Itokazu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 831 days.

(21) Appl. No.: 18/010,812

(22) PCT Filed: Sep. 10, 2020

(86) PCT No.: PCT/JP2020/034273
§ 371 (c)(1),
(2) Date: Dec. 16, 2022

(87) PCT Pub. No.: WO2022/054195
PCT Pub. Date: Mar. 17, 2022

(65) Prior Publication Data
US 2023/0241698 A1 Aug. 3, 2023

(51) Int. Cl.
*B23H 7/10* (2006.01)
*B23H 11/00* (2006.01)

(52) U.S. Cl.
CPC ............. *B23H 7/104* (2013.01); *B23H 7/105* (2013.01); *B23H 11/00* (2013.01)

(58) Field of Classification Search
CPC . B23H 1/028; B23H 7/02; B23H 7/04; B23H 7/20; B23H 7/065; B23H 7/104;
(Continued)

(56) References Cited

U.S. PATENT DOCUMENTS 11,161,189 B2    11/2021   D'Amario
2014/0332503 A1*  11/2014   Itokazu ................... B23H 7/06
                                                          219/69.18
(Continued)

FOREIGN PATENT DOCUMENTS

JP        2015-217438 A     12/2015
JP        2015-217457 A     12/2015
(Continued)

OTHER PUBLICATIONS

International Search Report and Written Opinion mailed on Nov. 24, 2020, received for PCT Application PCT/JP2020/034273, filed on Sep. 10, 2020, 9 pages including English Translation.

*Primary Examiner* — Brian W Jennison
(74) *Attorney, Agent, or Firm* — XSENSUS LLP

(57)              ABSTRACT

An apparatus includes one wire electrode wound multiple times around a plurality of guide rollers to form a parallel wire part in which a plurality of wire cutting parts are arranged in parallel, a discharge waveform control device that controls an interpolar voltage waveform based on a discharge waveform command, and a wire running control device that controls running of the wire electrode based on a wire electrode running command. Further, there is a cutting stage drive device that controls a relative position between the parallel wire part and the workpiece based on a stage command, a machining state acquisition section that acquires a cutting part electrical characteristic or electrode state information as machining state information, and a machining control device that determines the wire electrode running command, the discharge waveform command, and the stage command based on the machining state information.

12 Claims, 11 Drawing Sheets

(58) Field of Classification Search
CPC ........ B23H 7/105; B23H 7/107; B23H 11/00;
B28D 5/045; G05B 2219/45043
See application file for complete search history.

(56) References Cited

U.S. PATENT DOCUMENTS

| 2015/0053650 A1* | 2/2015 | Miyake ................. | B23H 1/028 |
| | | | 219/69.12 |
| 2016/0059338 A1* | 3/2016 | Miyake .................... | B23H 7/02 |
| | | | 219/69.12 |
| 2017/0060105 A1* | 3/2017 | Onodera ................. | B23H 7/20 |
| 2018/0229320 A1* | 8/2018 | Miyake ................. | B23H 7/105 |

FOREIGN PATENT DOCUMENTS

| JP | 2019-48374 A | 3/2019 |
| JP | 2019-188572 A | 10/2019 |

* cited by examiner

FIG.3

WIRE SPARK MACHINING APPARATUS AND METHOD FOR PRODUCING SEMICONDUCTOR WAFER

CROSS-REFERENCE TO RELATED APPLICATION

The present application is based on PCT filing PCT/JP2020/034273, filed Sep. 10, 2020, the entire contents of which are incorporated herein by reference.

FIELD

The present disclosure relates to a wire spark machining apparatus that performs spark machining to cut out a plurality of plate-like members collectively from a workpiece using a wire electrode, and to a method for producing a semiconductor wafer.

BACKGROUND

In a multi-wire spark machining apparatus, multiple portions of one wire electrode are located at intervals to form a plurality of wire cutting parts. Then, discharges are generated between the plurality of wire cutting parts and a workpiece, and a plurality of plate-like members are collectively cut out from the workpiece. Such a multi-wire spark machining apparatus is used for, for example, slicing in the semiconductor production process, in which a plurality of wafers are cut out from an ingot.

The wire spark machining apparatus described in Patent Literature 1 classifies the interpolar states in each cutting wire part into four types: short circuit, discharge, wraparound, and opening, and individually counts the number of occurrences of each state to obtain a machining state from the result of counting. Then, the machining feed speed, the frequency of interpolar pulse voltage application, and the like are controlled according to the obtained machining state. The wire spark machining apparatus described in Patent Literature 1 avoids the occurrence of discharge concentrations, wire electrode disconnections, and the like by controlling the machining feed speed, the frequency of interpolar pulse voltage application, and the like.

CITATION LIST

Patent Literature

Patent Literature 1: Japanese Patent Application Laid-open No. 2015-217457

SUMMARY

Technical Problem

The wire spark machining apparatus described in Patent Literature 1 is problematic in that it is difficult to reduce variation in the plate thickness of plate-like members to be cut out. The present disclosure has been made in view of the above, and an object thereof is to reduce variation in the plate thickness of plate-like members in multi-wire spark machining in which a plurality of plate-like members are collectively cut out from a workpiece.

Solution to Problem

In order to solve the above problem and achieve the object, the present disclosure includes: one wire electrode wound at one end around a supply side bobbin and wound at an other end around a collecting side bobbin, the wire electrode being wound multiple times around a plurality of guide rollers at intervals in a direction of a rotation axis of the guide rollers to form a parallel wire part in which a plurality of wire cutting parts are arranged in parallel; a discharge waveform control device to control, based on a discharge waveform command, an interpolar voltage waveform or an interpolar current waveform between the wire cutting parts and a workpiece; a wire running control device to control running of the wire electrode based on a wire electrode running command; a cutting stage drive control device to control, based on a stage command, a cutting feed stage that changes a relative position between the parallel wire part and the workpiece; a machining state acquisition section to acquire a cutting part electrical characteristic or electrode state information as machining state information, the cutting part electrical characteristic being a measured electrical characteristic between the wire cutting parts and the workpiece, the electrode state information being information on a state of the wire cutting parts; and a machining control device to determine the wire electrode running command, the discharge waveform command, and the stage command based on the machining state information.

Advantageous Effects of Invention

According to the present disclosure, it is possible to reduce variation in the plate thickness of plate-like members in multi-wire spark machining in which a plurality of plate-like members are collectively cut out from a workpiece.

BRIEF DESCRIPTION OF DRAWINGS

FIG. 3 is a diagram illustrating an example of an interpolar current waveform according to the first embodiment.

DESCRIPTION OF EMBODIMENTS

Hereinafter, embodiments will be described in detail with reference to the drawings. Note that the embodiments described below are examples, and the scope of the present disclosure is not limited by the embodiments described below. In addition, the embodiments described below can be appropriately combined for execution.

First Embodiment

Figure 1A:
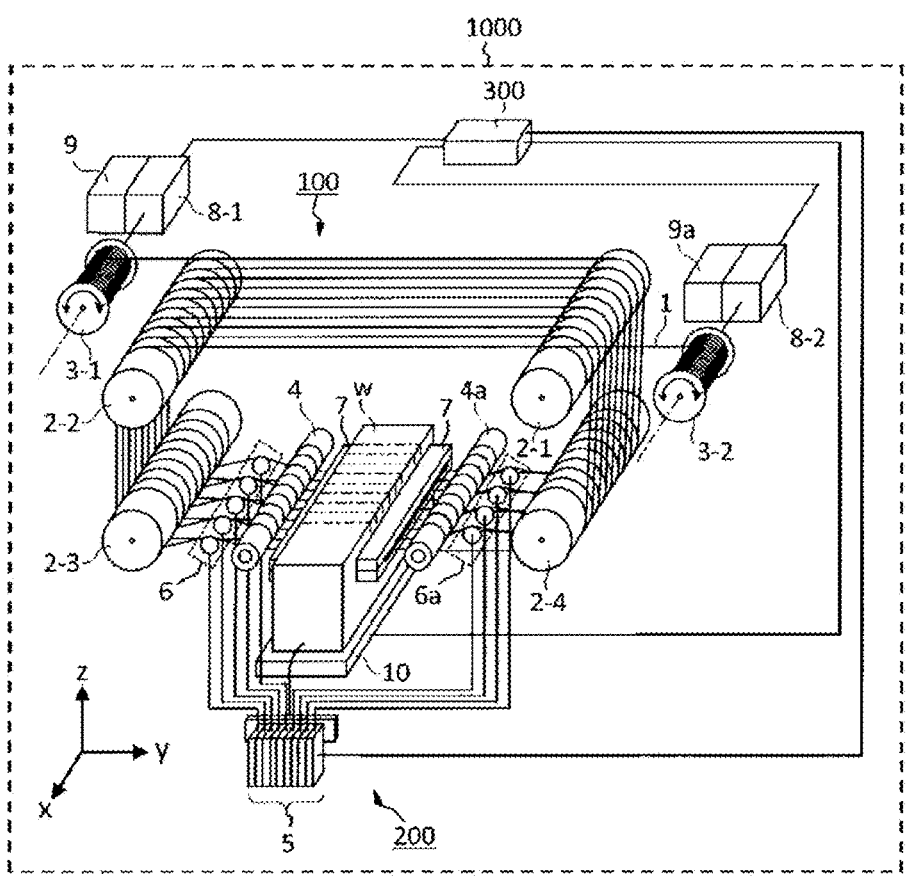
FIG. 1 is a diagram illustrating an exemplary configuration of a wire spark machining apparatus according to a first embodiment.
Figure 1B:
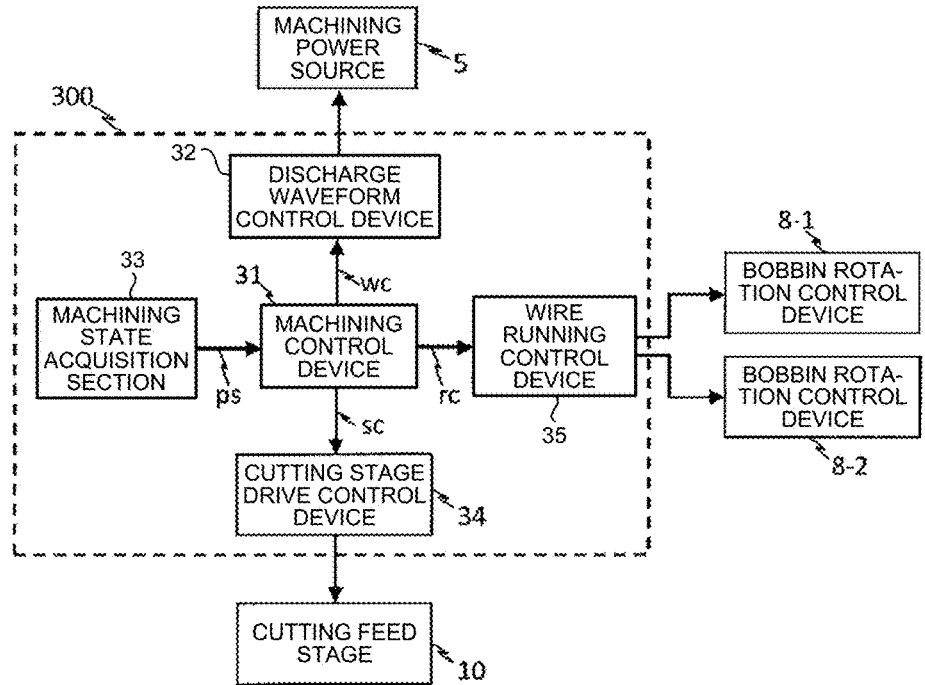

FIG. 1 is a diagram illustrating an exemplary configuration of a wire spark machining apparatus according to the present embodiment. FIG. 1A illustrates the configuration of the wire spark machining apparatus 1000, and FIG. 1B is a block diagram illustrating the configuration of a control section 300. FIG. 1A depicts the x axis, the y axis, and the z axis of a three-axis orthogonal coordinate system. The wire spark machining apparatus 1000 includes a machining mechanism section 100, a power supply section 200 that executes power supply, and the control section 300 that controls the wire spark machining apparatus 1000. The wire spark machining apparatus 1000 cuts out a plurality of plate-like members collectively from a workpiece w. Examples of the workpiece w can include tungsten, molybdenum, silicon carbide, single-crystal silicon, single-crystal silicon carbide, gallium nitride, and polycrystalline silicon.

The machining mechanism section 100 includes a plurality of guide rollers 2, a bobbin 3, a bobbin rotation control device 8-1, a bobbin rotation control device 8-2, a traverse control device 9, a traverse control device 9a, a damping guide roller 4, a damping guide roller 4a, a nozzle 7, and a cutting feed stage 10. The plurality of guide rollers 2 guide the running of a wire electrode 1. The bobbin 3 causes the wire electrode 1 to run by means of unwinding operation and winding operation. The bobbin rotation control device 8-1 and the bobbin rotation control device 8-2 control the rotation of the bobbin 3. The traverse control device 9 and the traverse control device 9a adjust the position of the bobbin 3 in the rotation axis direction. The damping guide roller 4 and the damping guide roller 4a reduce the vibration of the wire electrode 1. The nozzle 7 supplies machining fluid toward the workpiece w. The cutting feed stage 10 changes the relative position between the workpiece w and a parallel wire part 1a.

The power supply section 200 includes a power feeder unit 6, a power feeder unit 6a, and a machining power source 5. The machining power source 5 supplies power to the wire electrode 1 via the power feeder unit 6 and the power feeder unit 6a. The control section 300 includes a machining control device 31, a discharge waveform control device 32, a machining state acquisition section 33, a cutting stage drive control device 34, and a wire running control device 35. The machining control device 31 controls the discharge waveform control device 32, the machining state acquisition section 33, the cutting stage drive control device 34, and the wire running control device 35. The discharge waveform control device 32 controls the machining power source 5. The machining state acquisition section 33 outputs machining state information ps to be described later. The cutting stage drive control device 34 controls the cutting feed stage 10. The wire running control device 35 controls the running of the wire electrode 1.

The configuration and operation of the machining mechanism section 100 will be described. The plurality of guide rollers 2 include a guide roller 2-1, a guide roller 2-2, a guide roller 2-3, and a guide roller 2-4. Each of the plurality of guide rollers 2 is located rotatably around its rotation axis. The plurality of guide rollers 2 are arranged away from each other such that the rotation axes thereof are parallel to each other. The plurality of guide rollers 2 with their rotation axes parallel to each other enable the wire electrode 1 to run with higher accuracy. The rotation axes of the plurality of guide rollers 2 may be arranged in a non-parallel manner as long as the effect of the present embodiment can be achieved. The following description is based on the assumption that the rotation axes of the plurality of guide rollers 2 are parallel to the x axis in FIG. 1A.

One wire electrode 1 is wound multiple times around the plurality of guide rollers 2 at intervals in the direction of the rotation axis of each of the plurality of guide rollers 2. Consequently, wire cutting parts 1a-i of i=1 to i=n are formed. The wire cutting parts 1a-i of i=1 to i=n are each a portion of the wire electrode 1, and are collectively referred to as the parallel wire part 1a. The parallel wire part 1a, the wire cutting parts 1a-i, and the like are portions of the wire electrode 1, but at the same time, the wire cutting parts 1a-i and the like are also components of the wire spark machining apparatus 1000. Therefore, in the following description, a process in which a portion of the wire electrode 1 runs through the position of the wire cutting parts 1a-i for use in spark machining may be expressed by the sentence "the wire electrode 1 is supplied to the wire cutting parts 1a-i". In addition, each of the wire cutting parts 1a-i of i=1 to i=n may be referred to as the wire cutting part 1a-i. Here, reference character "n" is an integer of two or more, and reference character "i" is an integer of one to n unless otherwise specified. The wire cutting parts 1a-i of i=1 to i=n are desirably located in parallel to each other. In addition, it is desirable that the wire cutting parts 1a-i be provided at equal intervals. With the wire cutting parts 1a-i arranged in parallel and at equal intervals, a plurality of plate-like members to be cut out can have equal plate thicknesses, and have parallel cross sections. The arrangement of the wire cutting parts 1a-i may be a non-parallel arrangement or an unequal-interval arrangement as long as the effect of the present embodiment can be achieved. The number of guide rollers 2 need not necessarily be four, and may be three or less, or five or more.

The workpiece w is located between the damping guide roller 4 and the damping guide roller 4a, and the damping guide roller 4 and the damping guide roller 4a restrict the movement of the wire electrode 1 in the z-axis direction, thereby reducing the vibration of the wire electrode 1 in the parallel wire part 1a. Note that the damping guide roller 4 and the damping guide roller 4a can be omitted. The bobbin 3 includes a bobbin 3-1 and a bobbin 3-2. The bobbin rotation control device 8-1 and the traverse control device 9 control the bobbin 3-1. The bobbin rotation control device 8-2 and the traverse control device 9a control the bobbin 3-2. The bobbin rotation control device 8-1 and the bobbin rotation control device 8-2 are collectively referred to as the bobbin rotation control device 8. The bobbin rotation control device 8 controls the rotation of the bobbin 3 based on a command from the wire running control device 35 to control the running of the wire electrode 1. For example, the bobbin rotation control device 8 may control the running direction and the running speed of the wire electrode 1. The running direction of the wire electrode 1 in which the bobbin 3-1 performs unwinding operation and the bobbin 3-2 performs winding operation is referred to as the forward direction. The running direction of the wire electrode 1 in which the bobbin 3-1 performs winding operation and the bobbin 3-2 performs unwinding operation is referred to as the backward direction. That is, the backward direction is the running direction opposite to the forward direction. Note that the bobbin 3-1 may be referred to as the supply side bobbin, and the bobbin 3-2 may be referred to as the collecting side bobbin.

The traverse control device 9 and the traverse control device 9a control the position of the bobbin 3 in the x-axis direction according to the unwinding position or the winding position of the wire electrode 1. The x-axis direction is parallel to the rotation axis of the bobbin 3. The position control of the bobbin 3 by means of the traverse control device 9 and the traverse control device 9a is referred to as traverse control. The traverse control makes the bobbin 3 more stable and enables the wire electrode 1 to run with higher accuracy. The machining mechanism section 100 may further include a guide pulley that reduces the vibration of the wire electrode 1, a load cell that measures the tension of the wire electrode 1, a dancer roller that controls the tension of the wire electrode 1, and the like. By the load cell and the dancer roller, the tension of the wire electrode 1 may be maintained in a range suitable for the running of the wire electrode 1. For example, the dancer roller may control the tension of the wire electrode 1 by changing the unwinding speed and the winding speed of the wire electrode 1.

Figure 2A:
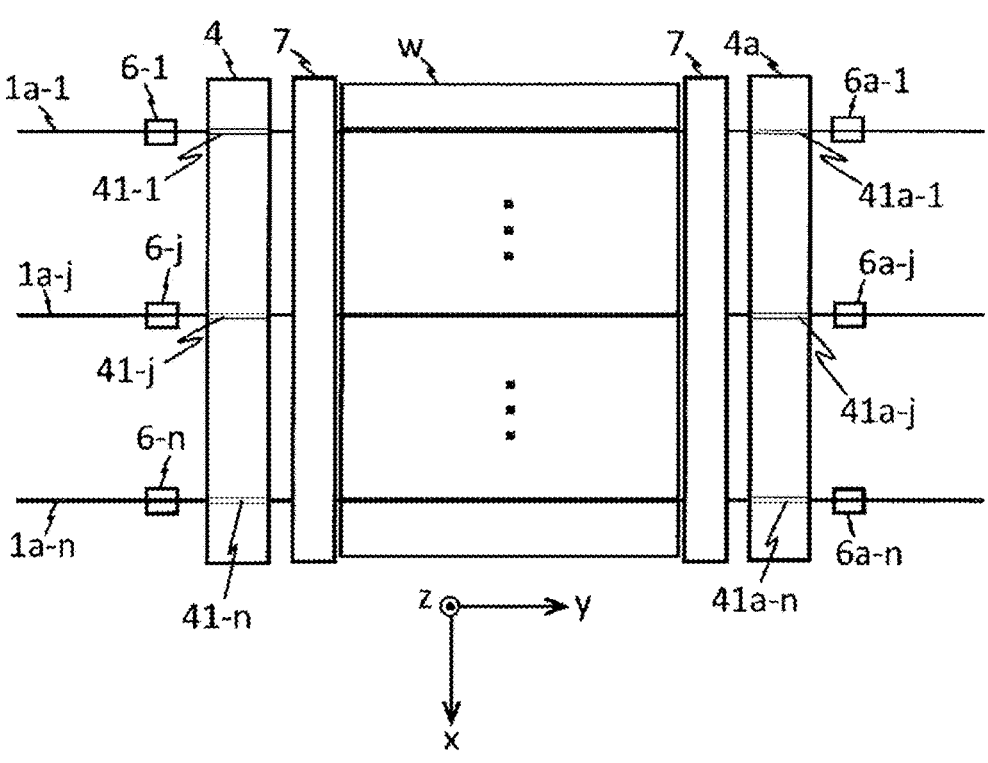
FIG. 2 is a diagram illustrating an exemplary configuration of the surrounding area of the workpiece in the wire spark machining apparatus according to the first embodiment.
Figure 2B:
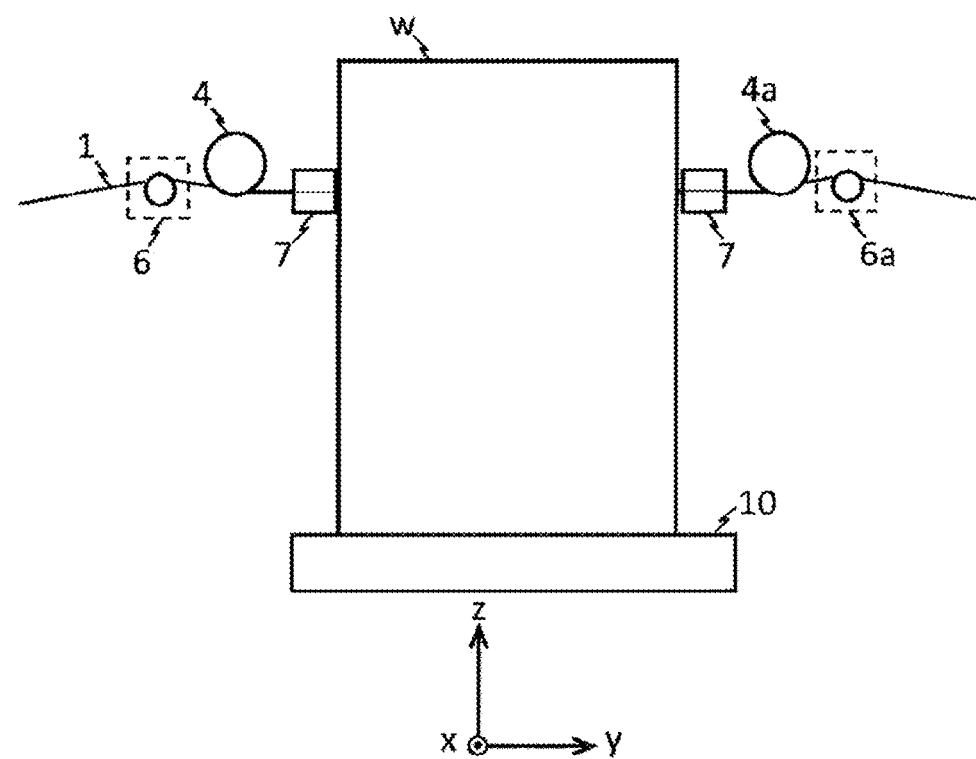

FIG. 2 is a diagram illustrating an exemplary configuration of the surrounding area of the workpiece in the wire spark machining apparatus according to the present embodiment. FIGS. 2A and 2B depict a three-axis orthogonal coordinate system. The directions of the coordinate axes in FIG. 2 coincide with those of the coordinate axes in FIG. 1A. FIG. 2A is a diagram illustrating the workpiece w and its surroundings as viewed in parallel to the z axis, and FIG. 2B is a diagram illustrating the workpiece w and its surroundings as viewed in parallel to the x axis. Note that reference character "j" in FIG. 2 is an integer of two to n-1. While the wire electrode 1 is running in the forward direction, each portion of the wire electrode 1 is first used for spark machining as the wire cutting part 1a-1, and then sequentially used as the wire cutting parts 1a-i of i=2 to i=n. On the other hand, while the wire electrode 1 is running in the backward direction, each portion of the wire electrode 1 is first used as the wire cutting part 1a-n, and then sequentially used as the wire cutting parts 1a-i of i=n-1 to i=1 for spark machining. Wire guide grooves 41-i of i=1 to i=n in FIG. 2 are referred to as the wire guide grooves 41. Wire guide grooves 41a-i of i=1 to i=n in FIG. 2 are referred to as the wire guide grooves 41a. Here, as illustrated in FIG. 2, the wire guide grooves 41 and the wire guide grooves 41a may be provided at multiple positions on the surfaces of the damping guide roller 4 and the damping guide roller 4a at equal intervals in the x-axis direction. Then, the wire electrode 1 may be located so as to be fit in each of the wire guide grooves 41 and each of the wire guide grooves 41a every time the wire electrode 1 is wound one turn around the plurality of guide rollers 2. This can make the intervals between the wire cutting parts 1a-i more uniform.

Machining fluid is supplied from the nozzle 7 toward the workpiece w. As illustrated in FIG. 2, the nozzle 7 is desirably placed with its ejection port close to the workpiece w, so that the machining fluid can permeate through the gap between the parallel wire part 1a and the workpiece w. In addition, the nozzle 7 may be connected to a machining fluid tank (not illustrated) and a pump (not illustrated). Alternatively, the workpiece w may be located inside a machining tank in which machining fluid is stored, and spark machining may be executed with the workpiece w immersed in the machining fluid. The supply of machining fluid to the gap between the workpiece w and the wire electrode 1 is effective in discharging machining chips produced between the workpiece w and the parallel wire part 1a out of the gap. Such machining chips can cause a short circuit between the workpiece w and the parallel wire part 1a, and thus the supply of machining fluid can lower the frequency of occurrence of short circuits. Note that the nozzle 7 can be omitted. The cutting feed stage 10 moves the parallel wire part 1a and/or the workpiece w to change the relative position between the workpiece w and the parallel wire part 1a. The term "between the wire cutting part 1a-i and the workpiece w" is referred to as "between the poles" or "interpolar". In addition, the distance between the poles is referred to as the interpolar distance. When a predetermined voltage is applied between the poles and the interpolar distance reaches a value in a predetermined range, discharges are generated between the poles to produce heat that melts the workpiece w. Then, a plurality of plate-like members are cut out collectively.

The power supply section 200 will be described. As illustrated in FIG. 2, the power feeder unit 6 includes power feeders 6-i of i=1 to i=n. As illustrated in FIG. 2, the power feeder unit 6a includes power feeders 6a-i of i=1 to i=n. The machining power source 5 supplies power to the wire cutting part 1a-i via the power feeders 6-i and the power feeders 6a-i to apply a voltage between the wire cutting part 1a-i and the workpiece w. The machining power source 5 executes power supply to the workpiece w. The machining power source 5 may control the voltage applied between the poles, the current flowing between the poles, and the like for each wire cutting part 1a-i.

Next, the control section 300 will be described. The control section 300 controls the wire spark machining apparatus 1000. The discharge waveform control device 32 controls the machining power source 5 based on a discharge waveform command wc, and controls the voltage waveform applied between the poles or the current waveform flowing between the poles. The discharge waveform control device 32 may control the voltage waveform, the current waveform, and the like for each wire cutting part 1a-i. The cutting stage drive control device 34 drives the cutting feed stage 10 based on a stage command sc, and controls the relative position between the workpiece w and the parallel wire part 1a. The wire running control device 35 controls the bobbin rotation control device 8 based on a wire electrode running command rc, and the bobbin rotation control device 8 rotates the bobbin 3. In this manner, the wire running control device 35 controls the running of the wire electrode 1 based on the wire electrode running command rc. The machining control device 31 determines the wire electrode running command rc, the discharge waveform command wc, and the stage command sc based on the machining state information ps acquired from the machining state acquisition section 33. The machining control device 31 maintains the interpolar distance, the interpolar voltage, the running state of the wire electrode 1, and the like in a state in which stable machining is executable. The machining state acquisition section 33 outputs the machining state information ps.

Exemplary operations and structures of the machining control device 31 and the machining state acquisition section 33 will be described. The machining state acquisition section 33 outputs a cutting part electrical characteristic ec-i as the machining state information ps. The machining state acquisition section 33 may output electrode state information es-i described in the second embodiment as the machining state information ps in addition to the cutting part electrical characteristic ec-i. Here, the cutting part electrical characteristic ec-i is defined as a measured quantity of an interpolar electrical characteristic in the wire cutting part 1*a-i*. The machining state acquisition section 33 desirably sets a quantity having a correlation with the interpolar distance of the wire cutting part 1*a-i* as the cutting part electrical characteristic ec-i. If the interpolar distance of the wire cutting part 1*a-i* and the cutting part electrical characteristic ec-i have a correlation, the machining control device 31 can associate the cutting part electrical characteristic ec-i with the interpolar distance of the wire cutting part 1*a-i*. For example, comparison of the value of the cutting part electrical characteristic ec-i between different values of i allows for comparison of the interpolar distance of the wire cutting part 1*a-i* between different values of i. In addition, detection of variations in the value of the cutting part electrical characteristic ec-i allows for detection of the magnitude of variation in the interpolar distance of the wire cutting part 1*a-i*. Examples of the cutting part electrical characteristic ec-i having a correlation with the interpolar distance of the wire cutting part 1*a-i* can include the interpolar voltage, the interpolar impedance, the interpolar current, the number of current pulses generated between the poles, and the ratio between the number of current pulses generated between the poles and the number of voltage pulses applied between the poles. Note that as the number of current pulses, current pulses whose energy, peak value, or the like is within a predetermined range may be counted. In addition, the cutting part electrical characteristic ec-i need not be the measured quantity itself of an interpolar electrical characteristic of the wire cutting part 1*a-i*. For example, a value calculated based on the measured quantity of an electrical characteristic may be used as the cutting part electrical characteristic ec-i, such as the interpolar impedance in the wire cutting part 1*a-i*.

A machined groove formed in the workpiece w by the wire cutting part 1*a-i* is referred to as a machined groove gi, and the groove width of the machined groove gi is referred to as a machined groove width si. Here, the interpolar distance of the wire cutting part 1*a-i* and the machined groove width si may have a correlation. If the cutting part electrical characteristic ec-i and the interpolar distance of the wire cutting part 1*a-i* have a correlation, it is possible to lower variation in the machined groove width si by controlling the running direction of the wire electrode based on the cutting part electrical characteristic ec-i.

The wire cutting part 1*a-i* to which each portion of the wire electrode 1 is supplied first is referred to as a leading wire cutting part. The cutting part electrical characteristic ec-i of the leading wire cutting part is referred to as a leading cutting part electrical characteristic lec. When the running direction of the wire electrode 1 is the forward direction, the wire cutting part 1*a-*1 is the leading wire cutting part, and the cutting part electrical characteristic ec-1 is the leading cutting part electrical characteristic lec. Next, the wire cutting part 1*a-i* to which each portion of the wire electrode 1 is supplied second or later is referred to as a subsequent wire cutting part. The cutting part electrical characteristic ec-i of the subsequent wire cutting part is referred to as a subsequent cutting part electrical characteristic sec. When the running direction of the wire electrode 1 is the forward direction, the subsequent wire cutting part has any one of the cutting part electrical characteristics ec-i of i=2 to n. The machining control device 31 may determine the direction in which the wire electrode 1 runs based on a result of comparison between the leading cutting part electrical characteristic lec and the subsequent cutting part electrical characteristic sec. As will be described later, by determining the running direction of the wire electrode 1 based on the comparison between the leading cutting part electrical characteristic lec and the subsequent cutting part electrical characteristic sec, it is possible to reverse the running direction of the wire electrode 1 in response to an increase in the difference in interpolar distance between the leading cutting part and the subsequent cutting part. Thus, it is possible to reduce variation in the plate thickness of plate-like members to be cut out.

Here, in order to achieve the effect of the present embodiment, the machining control device 31 is required to be able to compare the leading cutting part electrical characteristic lec with the subsequent cutting part electrical characteristic sec. For example, the machining control device 31 may determine the direction in which the wire electrode 1 runs by comparing the leading cutting part electrical characteristic lec with one subsequent cutting part electrical characteristic sec. As another example, the direction in which the wire electrode 1 runs may be determined by comparing the leading cutting part electrical characteristic lec with a quantity calculated from a plurality of subsequent cutting part electrical characteristics sec. As still another example, the direction in which the wire electrode 1 runs may be determined by comparing a quantity calculated from the leading cutting part electrical characteristic lec with a quantity calculated from a plurality of subsequent cutting part electrical characteristics sec. In the present embodiment, comparison between a quantity calculated from the leading cutting part electrical characteristic lec and a quantity calculated from the subsequent cutting part electrical characteristic sec is also referred to as comparison between the leading cutting part electrical characteristic lec and the subsequent cutting part electrical characteristic sec. Examples of quantities calculated from the subsequent cutting part electrical characteristics sec can include the geometric mean and the arithmetic mean of a plurality of subsequent cutting part electrical characteristics sec.

Figure 3:
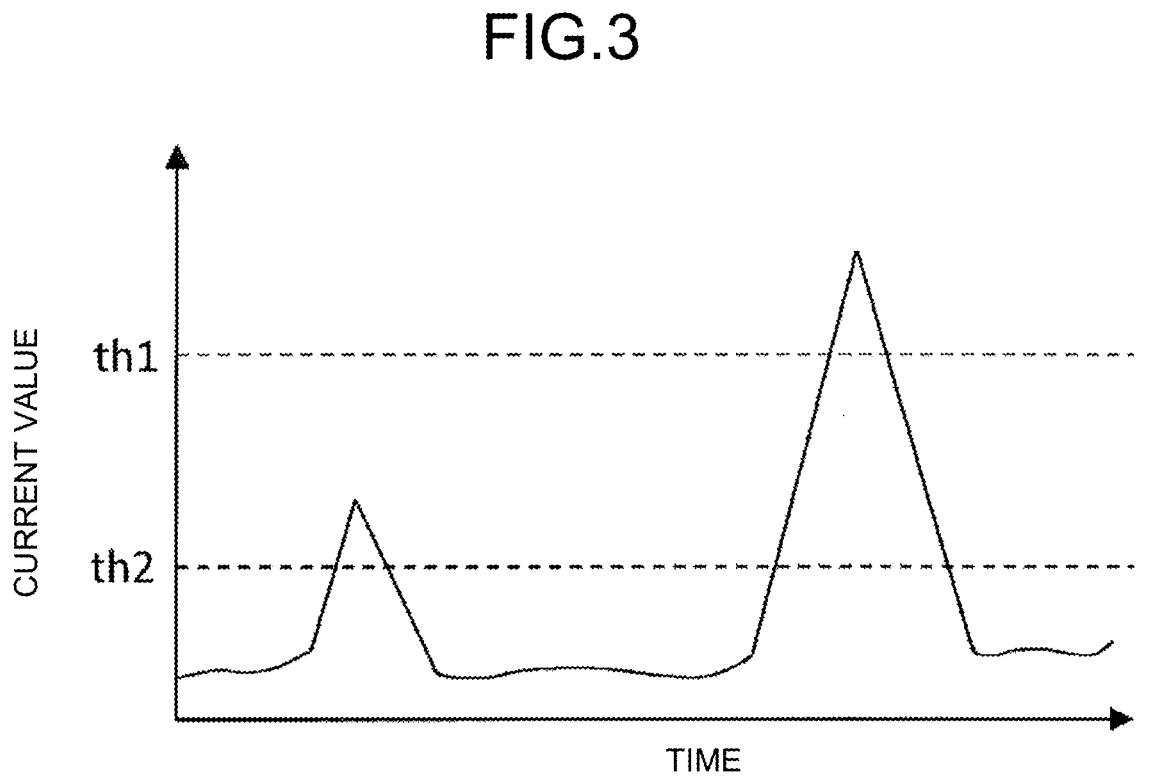

FIG. 3 is a diagram illustrating an example of an interpolar current waveform according to the present embodiment. In FIG. 3, the horizontal axis represents time, and the vertical axis represents the current value flowing between the poles. The current value flowing between the poles in the wire cutting part 1*a-i* is referred to as an interpolar current dc-i. An example operation of the machining state acquisition section 33 will be described with reference to FIG. 3. The machining state acquisition section 33 acquires the ratio between the number of current pulses having a peak value of the interpolar current dc-i within a predetermined range and the number of voltage pulses applied between the poles. It is assumed that the machining state acquisition section 33 has two thresholds: a first threshold th1 and a second threshold th2. Here, the first threshold th1 is larger than the second threshold th2. A state in which the peak value of the interpolar current dc-i is equal to the second threshold th2 or smaller than the second threshold th2 is identified by the machining state acquisition section 33 as the open state. A state in which the peak value of the interpolar current dc-i is a value between the first threshold th1 and the second threshold th2 is identified by the machining state acquisition section 33 as the discharge pulse generating state. A state in which the peak value of the interpolar current dc-i is equal to the first threshold th1 or larger than the first threshold th1 is identified by the machining state acquisition section 33 as the short-circuit state. By setting the value of the first threshold th1 and the value of the second threshold th2 based on a test or the like, each of the above states may be associated with a machining state. For example, the open state may be a state in which the interpolar distance is so large that there is no flow of current required for spark machining. In addition, the discharge pulse generating state may be a state in which the interpolar distance is within the range in which spark machining is properly executed. In addition, the short-circuit state may be a state in which the interpolar distance is smaller and the interpolar current dc-i is larger than in the state in which proper machining can be executed, or the short-circuit state may be a state in which the wire electrode 1 is likely to be disconnected.

The machining state acquisition section 33 calculates a pulse generation rate pr-i by dividing the number of detections of the discharge pulse generating state in the wire cutting part 1a-i during a unit time by the number of voltage pulses applied between the poles during the unit time. In the example described below, the pulse generation rate pr-i is used as the cutting part electrical characteristic ec-i. The pulse generation rate pr-i has a correlation with the interpolar distance in the wire cutting part 1a-i.

Figures 4A, 4B, 4C:
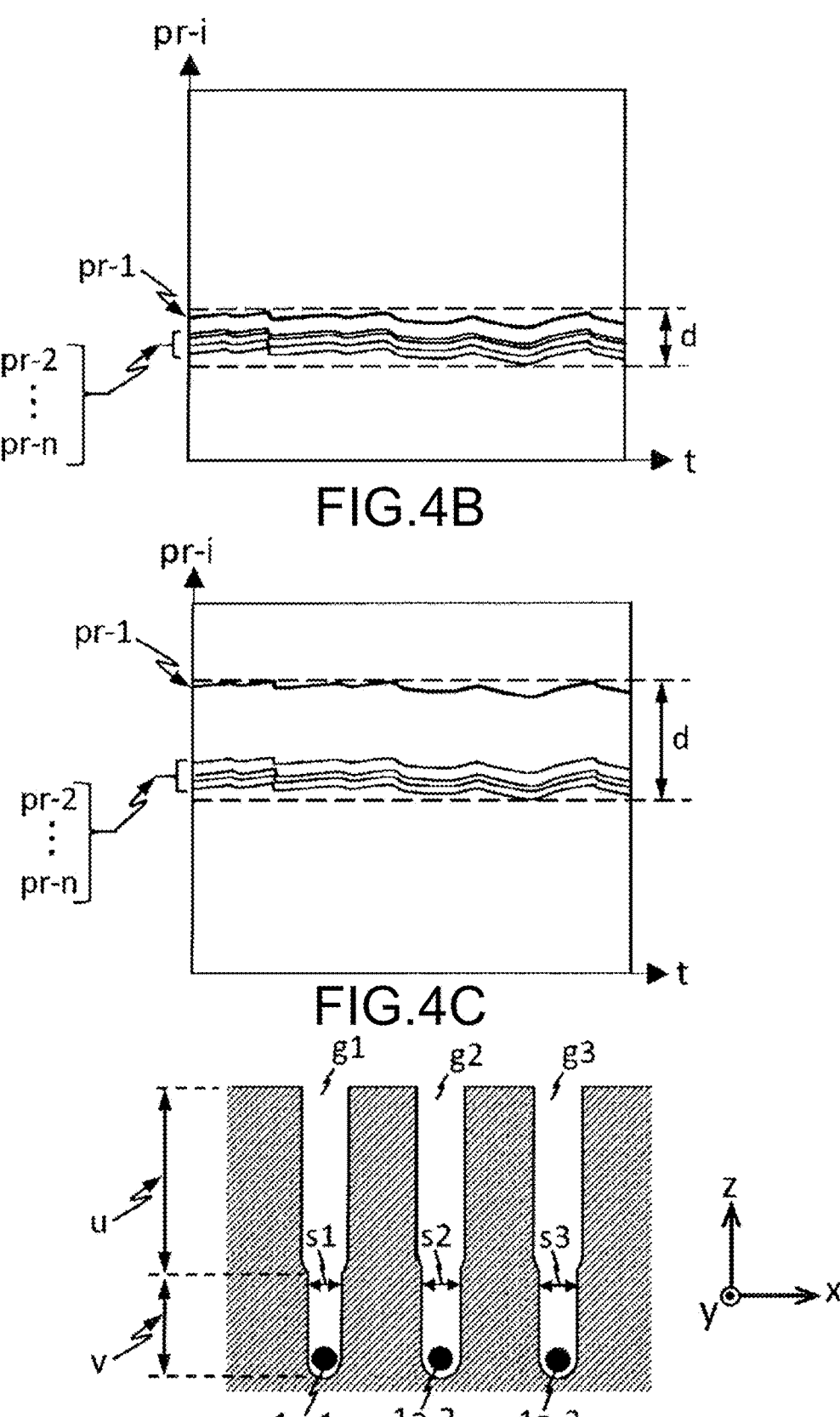
FIG. 4 is a diagram illustrating by example pulse generation rates of a plurality of wire cutting parts and a cross-sectional view of machined grooves formed in the workpiece, according to the first embodiment.

FIG. 4 is a diagram illustrating by example pulse generation rates of a plurality of wire cutting parts and a cross-sectional view of machined grooves formed in the workpiece, according to the present embodiment. An exemplary relationship between the pulse generation rate pr-i and the interpolar distance in the wire cutting part 1a-i will be described using FIG. 4. In FIGS. 4A and 4B, the horizontal axis represents time, and the vertical axis represents the pulse generation rate pr-i. FIG. 4C is a cross-sectional view of the workpiece w. FIG. 4C illustrates the wire cutting parts 1a-i of i=1 to i=3. The wire cutting parts 1a-i cut the workpiece w in the negative direction of the z axis to form the machined grooves gi of i=1 to i=3. It is to be noted that the machined groove widths si of i=1 to i=3 differ between the u portion and the v portion. In FIG. 4A, the pulse generation rate pr-i during the machining of the u portion of FIG. 4C is plotted. In FIG. 4B, the pulse generation rate pr-i during the machining of the v portion in FIG. 4C is plotted. The axial directions of the three-axis orthogonal coordinate system illustrated in FIG. 4 coincide with the axial directions of the coordinate system in FIG. 1. The cross section of the workpiece w in FIG. 4C is perpendicular to the y axis. For sake of simplicity, the pulse generation rate pr-i plotted in FIGS. 4A and 4B is in the range of only i=1 to i=5 among i=1 to i=n. In addition, for sake of simplicity, FIG. 4C illustrates g1 to g3 among the n machined grooves gi.

In the example of FIG. 4, the pulse generation rate pr-1 is used as the leading cutting part electrical characteristic lec, and the pulse generation rate pr-2 is used as the subsequent cutting part electrical characteristic sec. The subsequent cutting part electrical characteristic sec may be any one of the pulse generation rates pr-i of i=2 to i=n. In FIG. 4A, the difference between the leading cutting part electrical characteristic lec and the subsequent cutting part electrical characteristic sec is small, and at the u portion of FIG. 4C, the difference between the machined groove width s1 at the leading cutting part and the machined groove width s2 at the subsequent cutting part is small. On the other hand, in FIG. 4B, the difference between the leading cutting part electrical characteristic lec and the subsequent cutting part electrical characteristic sec is large, and at the v portion of FIG. 4C, the difference between the machined groove width s1 and the machined groove width s2 is large. In this manner, in the example of FIG. 4, the pulse generation rate pr-i that is the cutting part electrical characteristic ec-i and the interpolar distance in the wire cutting part 1a-i have a correlation. In addition, the interpolar distance and the machined groove width si in the wire cutting part 1a-i have a correlation, and thus the cutting part electrical characteristic ec-i and the machined groove width si have a correlation. The above shows that the magnitude of variation in the machined groove width si can be detected from the magnitude of the difference between the leading cutting part electrical characteristic lec and the subsequent cutting part electrical characteristic sec.

The machining control device 31 calculates a result of comparison between the leading cutting part electrical characteristic lec and the subsequent cutting part electrical characteristic sec as a quantitative index value, and determines the running direction of the wire electrode 1 based on the comparison between the calculated index value and a predetermined reference value. This makes it possible to determine the running direction of the wire electrode according to the magnitude of variation in machined groove width. The difference between the leading cutting part electrical characteristic lec and the subsequent cutting part electrical characteristic sec in the example of FIG. 4 is referred to as a generation rate difference d. In other words, the quantitative index value as the result of the comparison between the leading cutting part electrical characteristic lec and the subsequent cutting part electrical characteristic sec in the example of FIG. 4 is the generation rate difference d. Since the generation rate difference d in FIG. 4B is larger than the generation rate difference d in FIG. 4A, the variation in the machined groove width si of the v portion in FIG. 4C is accordingly larger than the variation in the machined groove width si of the u portion in FIG. 4C. In the case of the example of FIG. 4, a large generation rate difference d results in large variations in the machined groove width si. The machining control device 31 may determine the wire electrode running command rc using a correlation between the variation between the cutting part electrical characteristics ec-i and the variation in the interpolar distance in the wire cutting part 1a-i. Note that instead of the generation rate difference d, the machining control device 31 may use the maximum value of the difference between two of the pulse generation rates pr-i of i=1 to i=n as the quantitative index value as the result of comparison between the leading cutting part electrical characteristic lec and the subsequent cutting part electrical characteristic sec. Then, the running direction of the wire electrode 1 may be determined. In addition, the relationship between the cutting part electrical characteristic ec-i and the interpolar distance of the wire cutting part 1a-i can change depending on the selection of the cutting part electrical characteristic ec-i, the material of the workpiece w, the wire electrode running command rc, the discharge waveform command wc, the stage command sc, and the like. For example, there may be a situation opposite to that in the example of FIG. 4: the machined groove width s1 is larger than the machined groove widths si of i=2 to i=n when the leading cutting part electrical characteristic lec is larger than the subsequent cutting part electrical characteristic sec.

Figure 5:
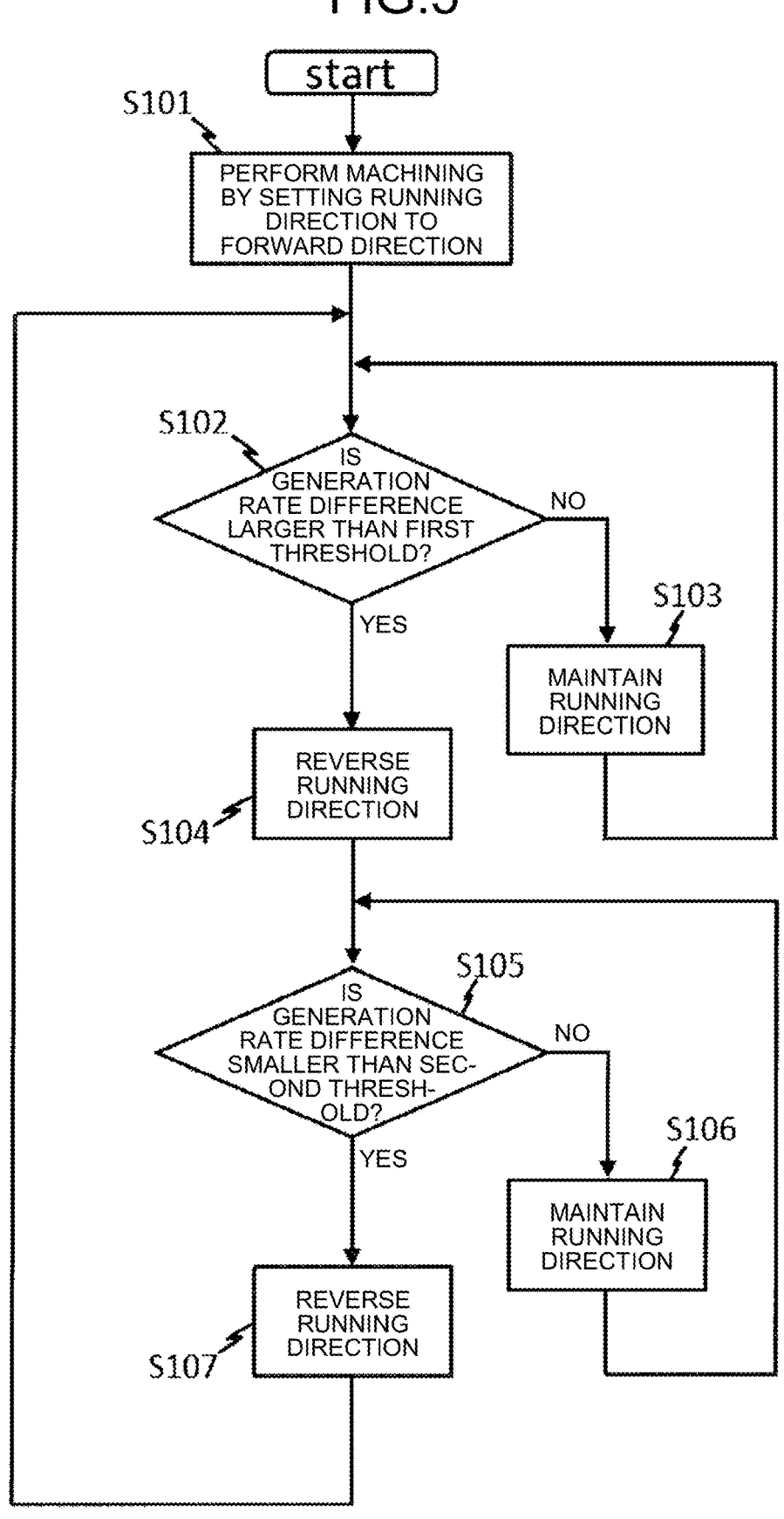
FIG. 5 is a flowchart illustrating an example operation of the wire spark machining apparatus according to the first embodiment.

FIG. 5 is a flowchart illustrating an example operation of the wire spark machining apparatus according to the present embodiment. An example operation of the wire spark machining apparatus 1000 will be described with reference to FIG. 5. In step S101, the machining control device 31 starts machining by setting the running direction of the wire electrode 1 to the forward direction in a state where the unused wire electrode 1 is supplied to the parallel wire part 1*a*, that is, in a state where the unused wire electrode 1 is attached to the bobbin 3-1. At this time, the unused wire electrode 1 is used as the wire cutting part 1*a*-1 which is the leading wire cutting part. On the other hand, because the portion of the wire electrode 1 used as the leading wire cutting part is supplied to the wire cutting parts 1*a*-*i* of i=2 to i=n which are the subsequent wire cutting part, the used portion of the wire electrode 1 is used as the subsequent wire cutting part.

The supply of an unused portion of the wire electrode 1 to the leading wire cutting part and the supply of a used portion of the wire electrode 1 to the subsequent wire cutting part cause a difference in machining state between the leading wire cutting part and the subsequent wire cutting part. The difference in machining state can be exemplified by a case where the workpiece w or the like adheres to the wire electrode 1 and causes a difference in the state of the wire electrode 1 which results in a difference in machining state. Differences also occur between the leading cutting part electrical characteristic lec and the subsequent cutting part electrical characteristic sec, and between the machined groove width s1 and the machined groove widths si of i=2 to i=n. In step S101, while the machining in which the running direction of the wire electrode 1 is set to the forward direction is continued, the generation rate difference d increases over time, and the difference between the machined groove width s1 and the machined groove widths si of i=2 to i=n also increases.

It is assumed that the machining control device 31 has two thresholds for the generation rate difference d as the index value. Thresholds may be referred to as reference values. The two thresholds are a first threshold Pth1 and a second threshold Pth2. Here, the second threshold Pth2 is a value smaller than the first threshold Pth1. In step S102, the machining control device 31 determines whether the generation rate difference d is larger than the first threshold Pth1. In response to determining in step S102 that the generation rate difference d is larger than the first threshold Pth1, the machining control device 31 proceeds to step S104, and reverses the running direction of the wire electrode 1 from the forward direction to the backward direction in step S104 to execute machining. On the other hand, in response to determining that the generation rate difference d is smaller than or equal to the first threshold Pth1, the machining control device 31 proceeds to step S103, maintains the running direction of the wire electrode 1 in the forward direction in step S103 to continue machining, and proceeds to step S102. Then, until it is determined in step S102 that the generation rate difference d is larger than the first threshold Pth1, the machining control device 31 repeatedly executes the operation procedure of steps S102 and S103.

The machining control device 31 determines the wire electrode running command rc, the discharge waveform command wc, and the stage command sc to perform the operation of reversing the running direction in step S104 as described below. For example, first, the power supply of the machining power source 5 and the running of the wire electrode 1 are stopped. At the same time, the cutting feed stage 10 is stopped so that the change of the relative position between the workpiece w and the parallel wire part 1*a* is stopped. Thereafter, the running of the wire electrode 1 in the backward direction and the power supply from the machining power source 5 are started. At the same time, the cutting feed stage 10 is operated so that the change of the relative position between the workpiece w and the parallel wire part 1*a* is started. In this manner, the operation of reversing the running direction in step S104 may be performed. During this reversing operation, the discharge waveform, the interpolar distance, and the like may be controlled so that spark machining can be stably executed.

Once the running direction of the wire electrode 1 is switched from the forward direction to the backward direction in step S104, all the portions of the wire electrode 1 to be supplied to the wire cutting parts 1*a*-*i* of i=1 to i=n turn to used portions of the wire electrode 1. Therefore, the variation in interpolar distance and the generation rate difference d in the parallel wire part 1*a* between different values of i decrease over time. The reversal of the running direction in step S104 can reduce variation in the machined groove width si. In step S105, the machining control device 31 determines whether the generation rate difference d is smaller than the second threshold Pth2. In response to determining in step S105 that the generation rate difference d is smaller than the second threshold Pth2, the machining control device 31 proceeds to step S107, reverses the running direction of the wire electrode 1 from the backward direction to the forward direction, and proceeds to step S102. On the other hand, in response to determining that the generation rate difference d is equal to the second threshold Pth2 or larger than the second threshold Pth2, the machining control device 31 proceeds to step S106, maintains the running direction of the wire electrode 1 in the backward direction to continue machining, and proceeds to step S105. Then, until it is determined in step S105 that the generation rate difference d is smaller than the second threshold Pth2, the machining control device 31 repeatedly executes the operation procedure of steps S105 and S106.

Here, if the wire electrode 1 keeps running in the backward direction after the reversal of the running direction of the wire electrode 1 in step S104, a portion of the wire electrode 1 is used more often than the other portion. Therefore, the difference in the number of uses between a portion of the wire electrode 1 and the other portion can be lowered through the conditional branching operation in step S105. The above is an example of the operation procedure of the wire spark machining apparatus 1000. In the conditional branching operation procedure of steps S102 and S105, the machining control device 31 determines the direction in which the wire electrode 1 runs based on the comparison between the leading cutting part electrical characteristic lec and the subsequent cutting part electrical characteristic sec. In addition, there is a correlation between the cutting part electrical characteristic ec-i and the interpolar distance, and the machining control device 31 calculates a result of comparison between the leading cutting part electrical characteristic lec and the subsequent cutting part electrical characteristic sec as a quantitative index value. Then, the running direction of the wire electrode 1 is determined based on the magnitude relationship between the calculated index value and a reference value that is a predetermined threshold. As a result, during forward running, it is possible to reverse the wire electrode 1 to the backward direction when the magnitude of variation in the machined groove width si exceeds the value corresponding to the first threshold Pth1 in the operation of step S102.

Thus, it is possible to lower variation in the machined groove width si. Thus, it is possible to reduce variation in the plate thickness of plate-like members to be cut out.

A reduction in the magnitude of variation in the machined groove width si results in reduced variation in the plate thickness of a plurality of plate-like members to be cut out from the workpiece w. This variation in plate thickness causes an increase in the time required for polishing, for example, in a process of making the variation in plate thickness less than or equal to a predetermined tolerance by polishing in a post-process of multi-wire spark machining in the semiconductor wafer production process. In addition, the lowered variation between the machined groove widths si leads to a more uniform supply of machining fluid to the machined grooves gi, whereby machining chips in the machined grooves si are uniformly removed, and the variation in the capacity of cooling by the machining fluid between the machined grooves si is lowered. Consequently, it is possible to lower the probability of occurrence of disconnections in the wire electrode 1. Further, the lowered probability of occurrence of disconnections in the wire electrode 1 allows more power to be supplied to the wire electrode 1, leading to an improvement in machining speed.

In addition, during backward running, it is possible to reverse the running direction of the wire electrode 1 to the forward direction when the magnitude of variation in the machined groove width si falls below the value corresponding to the second threshold Pth2 in the operation of step S105. Thus, it is possible to prevent a portion of the wire electrode 1 from being unevenly used more often than the other portion. The more uniform use of the entire wire electrode 1 can extend the life of the wire electrode 1 and prevent the occurrence of disconnections in the wire electrode 1.

Note that the effect of reducing variation in the machined groove width si can be achieved without steps S105 to S107 in the operation procedure of FIG. 5. In the operation procedure of FIG. 5, the operation procedure of steps S105 to S107 may be replaced with the operation procedure to be described in the second embodiment in which the running direction is reversed in response to the wire electrode 1 running a predetermined distance after the reversal of the running direction in step S104. In FIG. 5, the value of the difference between the leading cutting part electrical characteristic lec and the subsequent cutting part electrical characteristic sec is used as an index value quantitatively indicating a comparison result between the leading cutting part electrical characteristic lec and the subsequent cutting part electrical characteristic sec. The index value is not limited to the difference between the leading cutting part electrical characteristic lec and the subsequent cutting part electrical characteristic sec, and may be anything that quantitatively indicates a comparison result. For example, the ratio between the leading cutting part electrical characteristic lec and the subsequent cutting part electrical characteristic sec may be used as the index value.

In the flowchart of FIG. 5, the pulse generation rate pr-i is used as the cutting part electrical characteristic ec-i, but the cutting part electrical characteristic ec-i may be a quantity having a correlation with the interpolar distance of the wire cutting part 1a-i, whereby the state of the machined groove width si can be detected based on the cutting part electrical characteristic ec-i. Thus, effects similar to those of the operation example in FIG. 5 can be obtained. For example, the occurrence rate of the short-circuit state, the occurrence rate of the insulation state, or the like described with reference to FIG. 3 may be used as the cutting part electrical characteristic ec-i. In addition, the length of the portion of the wire cutting part 1a-i at which the workpiece w is cut can change with the progress of machining. As an example, in the case of machining in which the wire cutting part 1a-i is placed perpendicular to the central axis of the cylindrical workpiece w, the length of the portion at which the workpiece w is cut changes with the movement of the cutting feed stage 10. In such a case, the first threshold Pth1, the second threshold Pth2, and the like for the cutting part electrical characteristic ec-i in steps S102 and S105 of FIG. 5 may be changed according to the relative position between the cylindrical workpiece w and the parallel wire part 1a. That is, a reference value for the index value calculated as the result of comparison between the leading cutting part electrical characteristic lec and the subsequent cutting part electrical characteristic sec may be changed according to the relative position between the workpiece w and the parallel wire part 1a. This can provide effects similar to those of the operation example in FIG. 5.

In addition, the machining control device 31 may be configured not to reverse the running direction until the running distance or the running time of the wire electrode 1 exceeds a predetermined value after the reversal of the running direction. With such an operation, it is possible to avoid reversing operation under an unstable electrical characteristic between the parallel wire part 1a and the workpiece w, and to avoid the occurrence of malfunction. An example of an unstable electrical characteristic that occurs immediately after the reversal of the running direction can be a state in which the pulse generation rate pr-i becomes significantly lower immediately after the reversal of the running direction than the pulse generation rate pr-i before the reversal of the running direction. Another example can be a state in which the temporal fluctuation in the pulse generation rate pr-i becomes larger immediately after the reversal of the running direction than that in the pulse generation rate pr-i before the reversal of the running direction.

In the case of reversing the running direction of the wire electrode 1, the cumulative number of uses of the portion of the wire electrode 1 to be supplied to the parallel wire part 1a after the reversing can be larger than the cumulative number of uses of the portion of the wire electrode 1 supplied to the parallel wire part 1a before the reversing. In such a case, the machining control device 31 may execute either making the running speed of the wire electrode 1 after the reversing higher than before the reversing or making the interpolar discharge energy per unit time after the reversing lower than before the reversing. Consequently, it is possible to make the degree of wear of each portion of the wire electrode 1 more uniform. Here, the running speed may be the distance by which the wire electrode 1 runs per unit time. Alternatively, the running speed may be the length by which the wire electrode 1 is unwound or wound per unit time. Thus, it is possible to slow down the wear of the wire electrode 1 and extend its life. Here, the cumulative number of uses may be the number of uses as the parallel wire part 1a for spark machining. In addition, the machining control device 31 may acquire the electrode state information es-i described in the second embodiment, and calculate the cumulative number of uses based on the acquired electrode state information es-i. The machining control device 31 may obtain the cumulative number of uses based on the cutting part electrical characteristic ec-i. The machining control device 31 may calculate the cumulative number of uses of the wire electrode 1 based on the electrode state information es-i, and increase the running speed of the wire electrode 1 as the cumulative number of uses calculated increases. Consequently, it is possible to slow down the wear of the wire electrode 1 and extend its life.

Figure 6:
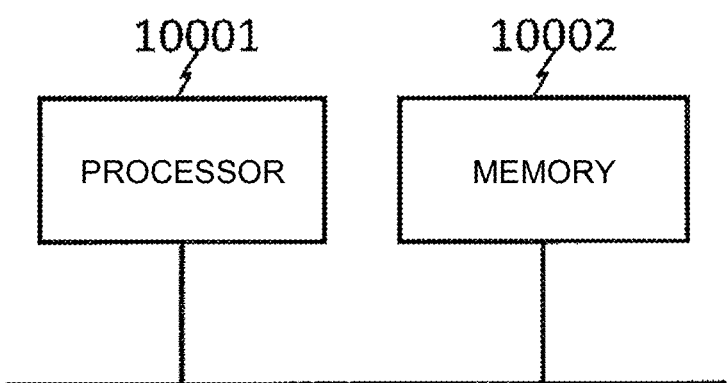
FIG. 6 is a diagram illustrating an exemplary configuration in which processing circuitry provided in the wire spark machining apparatus according to the first embodiment is configured by a processor and a memory.

FIG. 6 is a diagram illustrating an exemplary configuration in which processing circuitry provided in the wire spark machining apparatus according to the present embodiment is configured by a processor and a memory. In a case where the processing circuitry is configured by a processor 10001 and a memory 10002, each function of the wire spark machining apparatus 1000 is implemented by software, firmware, or a combination of software and firmware. Software, firmware, or the like is described as programs and stored in the memory 10002. In the processing circuitry, the processor 10001 reads and executes the programs stored in the memory 10002, thereby implementing each function. That is, the processing circuitry includes the memory 10002 for storing the programs that result in the processing of the wire spark machining apparatus 1000. It can also be said that these programs cause a computer to execute the procedures and methods for the wire spark machining apparatus 1000. The processor 10001 may be a central processing unit (CPU), a processing device, an arithmetic device, a microprocessor, a microcomputer, or a digital signal processor (DSP). The memory 10002 may be a non-volatile or volatile semiconductor memory such as a random access memory (RAM), a read only memory (ROM), a flash memory, an erasable programmable ROM (EPROM), or an electrically EPROM (EEPROM, registered trademark). Alternatively, the memory 10002 may be a magnetic disk, a flexible disk, an optical disk, a compact disk, a mini disk, or a digital versatile disc (DVD).

Figure 7:
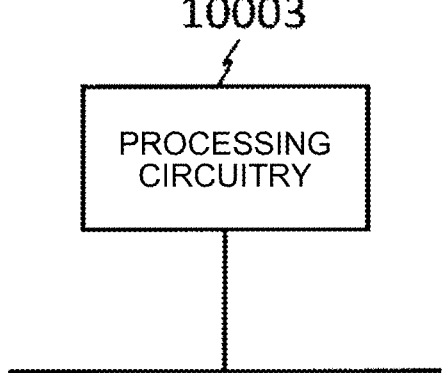
FIG. 7 is a diagram illustrating an exemplary configuration in which processing circuitry provided in the wire spark machining apparatus according to the first embodiment is configured by dedicated hardware.

FIG. 7 is a diagram illustrating an exemplary configuration in which processing circuitry provided in the wire spark machining apparatus according to the present embodiment is configured by dedicated hardware. In a case where the processing circuitry is configured by dedicated hardware, the processing circuitry 10003 illustrated in FIG. 7 may be, for example, a single circuit, a composite circuit, a programmed processor, a parallel programmed processor, an application specific integrated circuit (ASIC), a field programmable gate array (FPGA), or a combination thereof. The functions of the wire spark machining apparatus 1000 may be implemented by different pieces of processing circuitry 10003, or a plurality of functions may be collectively implemented by one piece of processing circuitry 10003. The processing circuitry need not necessarily be located near the machining mechanism section 100, the power supply section 200, or the like. For example, the control section 300 in FIG. 1 may be configured as processing circuitry, the control section 300 may be placed away from the machining mechanism section 100 and the power supply section 200, and the control section 300 may be connected to the machining mechanism section 100 and the power supply section 200 via a network. In addition, the control section 300 may be configured as processing circuitry on a cloud server, for example.

The wire spark machining apparatus 1000 includes one wire electrode 1. The wire electrode 1 is wound at one end around the bobbin 3-1 and wound at the other end around the bobbin 3-2. The wire electrode 1 is wound multiple times around the plurality of guide rollers 2 at intervals in the direction of the rotation axis of the guide roller 2-1 and the like to form the parallel wire part 1a in which the plurality of wire cutting parts 1a-i are arranged in parallel. The wire spark machining apparatus 1000 also includes the discharge waveform control device 32 that controls, based on the discharge waveform command wc, the interpolar voltage waveform or the current waveform flowing between the poles, namely between the wire cutting part 1a-i and the workpiece w. The wire spark machining apparatus 1000 also includes the wire running control device 35 and the cutting stage drive control device 34. The wire running control device 35 controls the running of the wire electrode 1 based on the wire electrode running command rc. The cutting stage drive control device 34 controls, based on the stage command sc, the cutting feed stage 10 that changes the relative position between the parallel wire part 1a and the workpiece w. The wire spark machining apparatus 1000 also includes the machining state acquisition section 33 that acquires the cutting part electrical characteristic ec-i or the electrode state information es-i as the machining state information ps, the cutting part electrical characteristic ec-i being a measured electrical characteristic between the wire cutting part 1a-i and the workpiece w, the electrode state information es-i being information on the state of the wire cutting part 1a-i. The wire spark machining apparatus 1000 also includes the machining control device 31 that determines the wire electrode running command rc, the discharge waveform command wc, and the stage command sc based on the machining state information ps.

In addition, the workpiece w may be a semiconductor ingot from which semiconductor wafers can be produced. For example, one wire electrode 1 is wound at one end around the bobbin 3-1 and wound at the other end around the bobbin 3-2. Then, the wire electrode 1 is wound multiple times around the plurality of guide rollers 2 at regular intervals in the direction of the rotation axis of the guide roller 2-1 and the like to form the parallel wire part 1a in which a plurality of wire cutting parts are arranged in parallel. Then, the interpolar voltage waveform or the interpolar current waveform between the wire cutting part 1a-i and the semiconductor ingot is controlled based on the discharge waveform command wc. Then, the cutting feed stage 10 that changes the relative position between the parallel wire part 1a and the semiconductor ingot is controlled based on the stage command sc. Further, the cutting part electrical characteristic ec-i which is an electrical characteristic between the wire cutting part 1a-i and the workpiece w or the electrode state information es-i which is information on the state of the wire cutting part 1a-i is acquired as the machining state information ps. Then, the wire electrode running command rc, the discharge waveform command wc, and the stage command sc are determined based on the machining state information ps. In this way, a plurality of semiconductor wafers are cut out from the semiconductor ingot.

As described above, according to the present embodiment, it is possible to reduce variation in the plate thickness of plate-like members in multi-wire spark machining in which a plurality of plate-like members are collectively cut out from a workpiece. In addition, it is possible to use the entire wire electrode 1 more equally. In addition, it is possible to lower the probability of occurrence of disconnections in the wire electrode 1. In addition, it is possible to extend the life of the wire electrode 1.

Second Embodiment

Figure 8A:
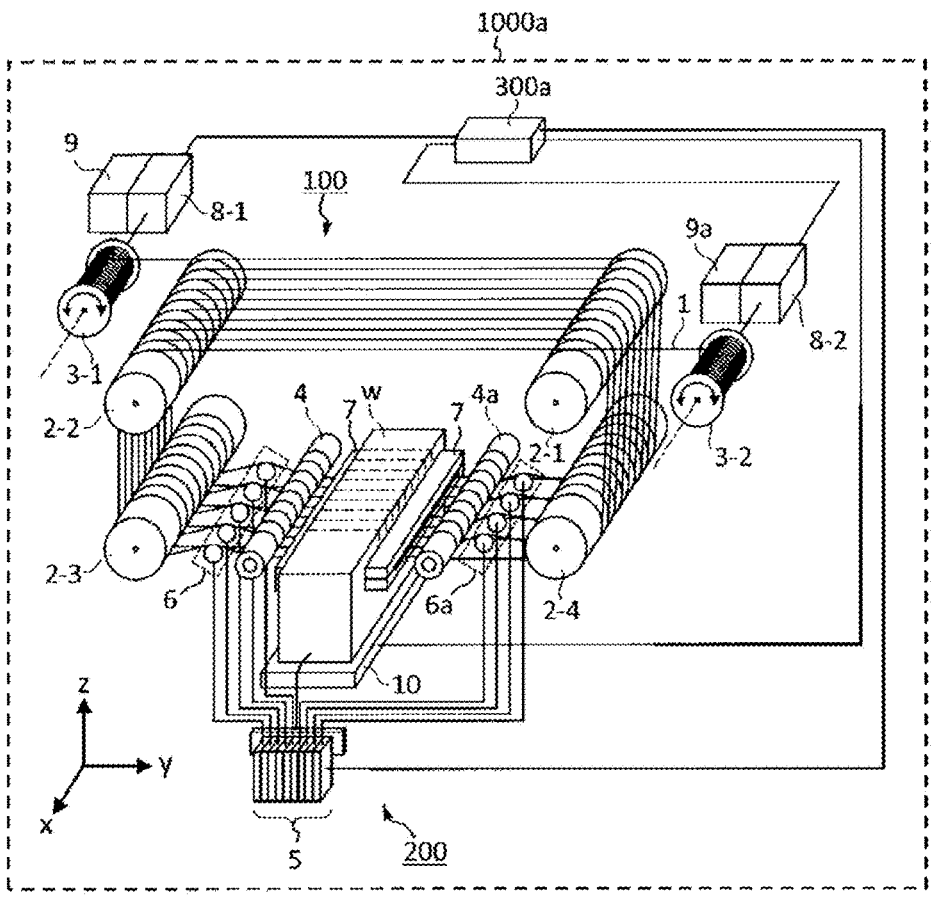
FIG. 8 is a diagram illustrating an exemplary configuration of a wire spark machining apparatus according to a second embodiment.
Figure 8B:
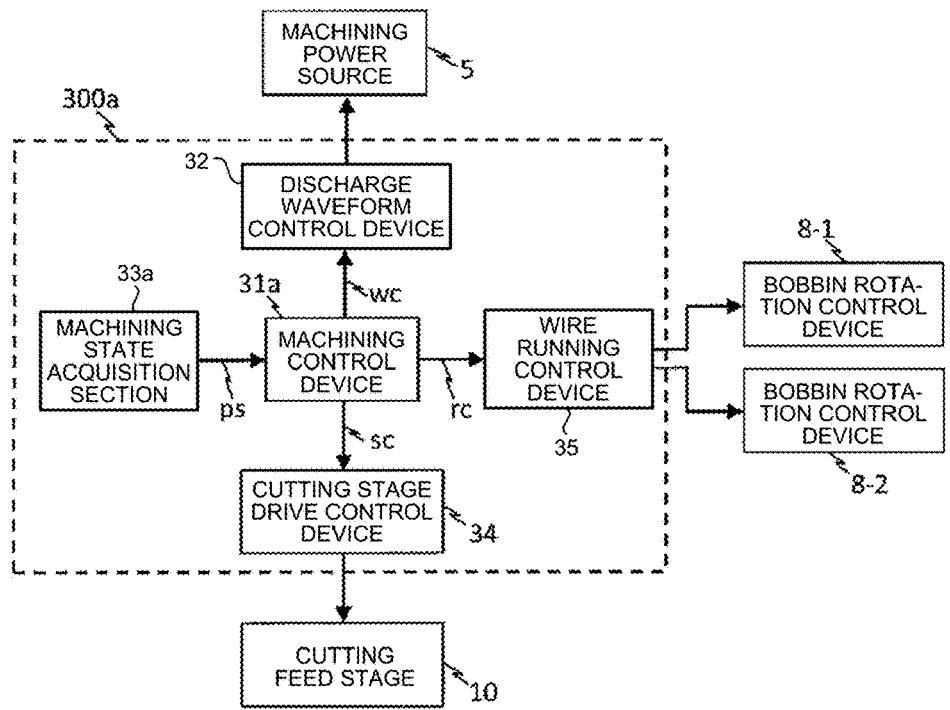

FIG. 8 is a diagram illustrating an exemplary configuration of a wire spark machining apparatus according to the present embodiment. FIG. 8A illustrates the entire configuration of the wire spark machining apparatus 1000a, and FIG. 8B is a block diagram illustrating the configuration of a control section 300a. The wire spark machining apparatus 1000a according to the present embodiment includes the control section 300a instead of the control section 300 illustrated in FIG. 1 according to the first embodiment. Further, the control section 300a includes a machining control device 31a instead of the machining control device 31 illustrated in FIG. 1 according to the first embodiment, and includes a machining state acquisition section 33a instead of the machining state acquisition section 33. In the description of the present embodiment, components identical or corresponding to those of the wire spark machining apparatus 1000 described in the first embodiment are denoted by the same reference signs. The machining state acquisition section 33a acquires the electrode state information es-i, and outputs the acquired electrode state information es-i as the machining state information ps. The machining control device 31a determines the wire electrode running command rc, the discharge waveform command wc, and the stage command sc based on the machining state information ps.

The machining state acquisition section 33a acquires, as the electrode state information es-i, information on the state of the wire electrode 1 used as the wire cutting part 1a-i. The electrode state information es-i may be information indicating the usage state of the wire electrode 1, or a quantity having a correlation with the number of uses of the wire electrode 1 for spark machining or the amount of the wire electrode 1 used for spark machining. Alternatively, the electrode state information es-i may be a quantity having a correlation with the cumulative usage amount of each portion of the wire electrode 1, a quantity indicating the cumulative usage amount of each portion of the wire electrode 1, or the like. Here, examples of the electrode state information es-i can include information indicating the cumulative usage amount of each portion of the wire electrode 1 at the time of detection of the electrode state information es-i, information indicating how much each portion of the wire electrode 1 has changed by being used for spark machining, wire running records of the running direction, running distance, and running speed of the wire electrode 1, and captured images of the surface of the wire electrode 1. The machining state acquisition section 33a can acquire the electrode state information es-i with various methods. For example, the electrode state information es-i may be acquired from a measurement result from an encoder provided on the bobbin 3. Alternatively, an input interface may be provided in the machining state acquisition section 33a, and the electrode state information es-i may be acquired through an operator's input. Still alternatively, an imaging device that captures an image of the wire electrode 1 to be supplied to the parallel wire part 1a may be provided, and the electrode state information es-i may be determined from the image of the wire electrode 1. In a case where the electrode state information es-i is a quantity having a correlation with the usage state of each portion of the wire electrode 1, it is possible to reduce variation in the plate thickness of plate-like members to be cut out by determining the running direction of the wire electrode 1 based on the electrode state information es-i.

Figure 9:
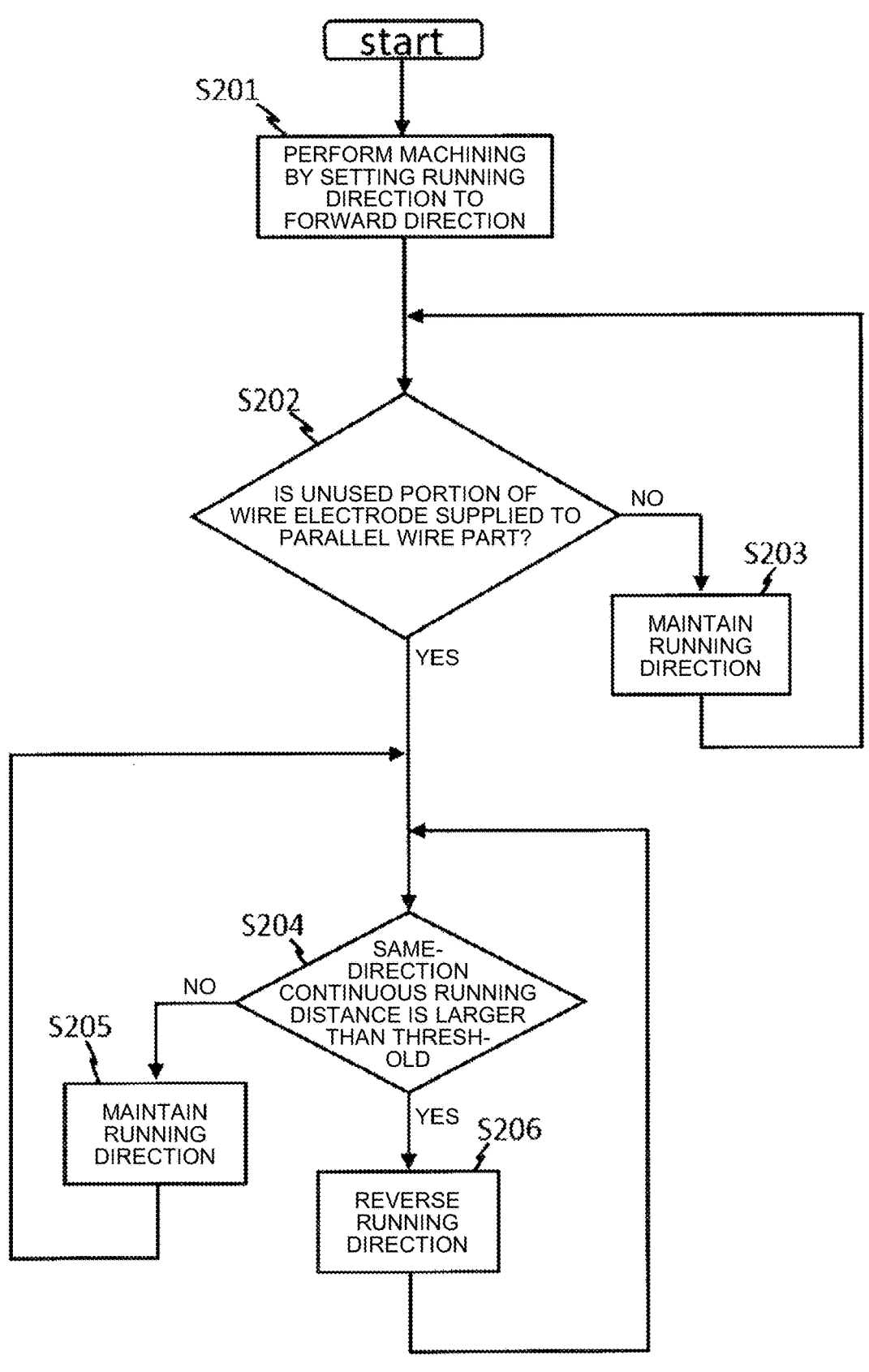
FIG. 9 is a flowchart illustrating an example operation of the wire spark machining apparatus according to the second embodiment.

FIG. 9 is a flowchart illustrating an example operation of the wire spark machining apparatus according to the present embodiment. An example operation of the wire spark machining apparatus 1000a will be described with reference to FIG. 9. In step S201, the machining control device 31a starts machining by setting the running direction of the wire electrode 1 to the forward direction. In step S202, the machining control device 31a determines based on the machining state information ps whether the wire electrode 1 to be supplied to the parallel wire part 1a is unused or has been used. For example, the machining control device 31a acquires the running direction and the running distance of the wire electrode 1 as the machining state information ps. Then, whether the wire electrode 1 to be supplied to the parallel wire part 1a is unused may be determined from the cumulative forward running distance, the cumulative backward running distance, the length of the wire electrode 1, and the like. Alternatively, for example, the machining control device 31a may acquire, as the machining state information ps, information indicating how much the wire electrode 1 has been used from a captured image of the wire electrode 1, and determine whether the wire electrode 1 to be supplied to the parallel wire part 1a is unused based on the machining state information ps.

In response to determining in step S202 that a used portion of the wire electrode 1 is supplied to the parallel wire part 1a, the machining control device 31a proceeds to step S203, maintains the running direction in the forward direction in step S203 to continue machining, and proceeds to step S202. Then, until it is determined in step S202 that an unused portion of the wire electrode is supplied to the parallel wire part 1a, the machining control device 31a repeatedly executes the operation procedure of steps S202 and S203. On the other hand, in response to determining in step S202 that an unused portion of the wire electrode 1 is supplied to the parallel wire part 1a, the machining control device 31a proceeds to step S204. In step S204, the machining control device 31a determines based on the electrode state information es-i, that is, the machining state information ps, whether the same-direction continuous running distance is larger than a predetermined threshold. Here, the same-direction continuous running distance is the distance by which the wire electrode 1 has continuously run while maintaining the running direction in the same direction. In other words, the same-direction continuous running distance is the distance by which the wire electrode 1 has continuously run without reversing the running direction. For example, the machining control device 31a may acquire the running direction and the running distance of the wire electrode 1 as the machining state information ps, calculate the same-direction continuous running distance, and compare the calculated same-direction continuous running distance with the threshold to execute the determination in step S204. Note that the machining state information ps used by the machining control device 31a for the determination in step S202 and the machining state information ps used by the machining control device 31a for the determination in step S204 may be the same or different.

In response to determining in step S204 that the same-direction continuous running distance is larger than the threshold, the machining control device 31a proceeds to step S206. In step S206, the machining control device 31a reverses the running direction to execute machining, and proceeds to step S204. In response to determining in step S204 that the same-direction continuous running distance is smaller than the threshold or equal to the threshold, the machining control device 31a proceeds to step S205, maintains the running direction in step S205 to continue machining, and proceeds to step S204. Note that the determination in step S204 is made either during forward running or during backward running. The threshold of the same-direction continuous running distance in the case of forward running and the threshold of the same-direction continuous running distance in the case of backward running may be the same value, but are desirably different values. As described above, the machining control device 31a determines whether to reverse the running direction based on whether the same-direction continuous running distance is larger than the threshold through conditional branching in step S204 of FIG. 9. Consequently, it is possible to reduce variation in the machined groove width si. In other words, it is possible to lower the variation in plate thickness between a plurality of plate-like materials to be collectively cut out from the workpiece w. In addition, it is possible to mitigate uneven use of the wire electrode 1. Here, the term "uneven use" means that the cumulative usage amount of a portion of the wire electrode 1 is larger than the cumulative usage amount of another portion of the wire electrode 1.

In the conditional branching in step S202, the machining control device 31a determines whether to execute the control of reversing the running direction of the wire electrode 1 depending on whether an unused portion of the wire electrode 1 is supplied to the parallel wire part 1a. Consequently, when a used portion of the wire electrode 1 is supplied to the parallel wire part 1a, the running direction is not reversed, and the running direction of the wire electrode 1 is maintained in one direction. This makes it possible to avoid unnecessary reversal of the running direction and associated interruption of machining, leading to efficient machining. On the other hand, when an unused portion of the wire electrode 1 is supplied, the control of reversing the running direction of the wire electrode 1 is executed so that the variation in plate thickness between a plurality of plate-like materials to be cut out can be lowered. In addition, it is possible to prevent a portion of the wire electrode 1 from being used more often than the other portion. Note that in the operation procedure of FIG. 9, step S202 may be skipped, and the operation procedure in which step S201 directly leads to step S204 may be executed. This operation procedure also allows the running direction of the wire electrode 1 to be reversed every time the same-direction continuous running distance reaches a predetermined distance. Thus, when an unused portion of the wire electrode 1 is supplied, it is possible to lower variation in the machined groove width si.

The operation procedure described with reference to FIG. 5 in the first embodiment can be executed in combination with a portion of the operation procedure described with reference to FIG. 9. For example, the machining state acquisition section 33 may further acquire the electrode state information es-i as the machining state information ps, and execute the conditional branching operation in step S202 of FIG. 9 in addition to the operation procedure in FIG. 5. Then, only when an unused portion of the wire electrode 1 is supplied to the parallel wire part 1a, the control of reversing the running direction of the wire electrode 1 may be executed. Consequently, when it is determined that the control of reversing the running direction of the wire electrode 1 is unnecessary, it is possible to avoid interruption of machining due to the reversal of the running direction of the wire electrode 1, leading to efficient execution of machining. In addition, the operation procedure described with reference to FIG. 5 in the first embodiment can be added to the operation procedure described with reference to FIG. 9. For example, the machining control device 31a acquires the cutting part electrical characteristic ec-i described in FIG. 5 as the machining state information ps in addition to the electrode state information es-i. Then, the machining control device 31a may execute the conditional branching operation such as step S102 or step S105 in FIG. 5 instead of the conditional branching operation of step S204 in FIG. 9 to control the running direction of the wire electrode 1.

As in the first embodiment, in the operation procedure of FIG. 9, the machining control device 31a may determine the wire electrode running command rc such that the running distance of the wire electrode 1 after the reversal of the running direction does not exceed the running distance of the wire electrode 1 before the preceding reversal of the running direction. Thus, each portion of the wire electrode 1 may be used more uniformly. As in the first embodiment, in the operation procedure of FIG. 9, the machining control device 31a may determine the wire electrode running command rc so as to make the running speed of the wire electrode 1 after the reversal faster than the running speed of the wire electrode 1 before the reversal. In addition, the discharge energy per unit time may be made lower after the reversal of the running direction than before the reversal of the running direction. In other words, in the case of reversing the running direction of the wire electrode 1, the cumulative number of uses of the portion of the wire electrode 1 to be supplied to the parallel wire part 1a after the revering can be larger than the cumulative number of uses of the portion of the wire electrode 1 supplied to the parallel wire part 1a before the reversing. In such a case, the machining control device 31a may execute either making the running speed of the wire electrode 1 after the reversing higher than before the reversing or making the interpolar discharge energy per unit time after the reversing lower than before the reversing. Here, the cumulative number of uses of each portion of the wire electrode 1 may be the number of uses of each portion of the wire electrode 1 as the parallel wire part 1a for spark machining. Consequently, it is possible to make the degree of wear of each portion of the wire electrode 1 more uniform. In addition, the machining control device 31a may obtain the cumulative number of uses based on the electrode state information es-i, the cutting part electrical characteristic ec-i, and the like. The machining control device 31a may calculate the cumulative number of uses of the wire electrode 1 based on the electrode state information es-i, and increase the running speed of the wire electrode 1 as the cumulative number of uses calculated increases. Consequently, it is possible to slow down the wear of the wire electrode 1 and extend its life.

According to the present embodiment, it is possible to reduce variation in the plate thickness of plate-like members in multi-wire spark machining in which a plurality of plate-like members are collectively cut out from a workpiece. In addition, it is possible to use the entire wire electrode 1 more uniformly. As a result, it is possible to reduce the probability of occurrence of disconnections in the wire electrode 1. In addition, it is possible to extend the life of the wire electrode 1. In addition, it is possible to stop the control of reversing the running direction of the wire electrode 1 when a used portion of the wire electrode 1 is supplied to the parallel wire part 1a. Therefore, machining can be executed efficiently.

Third Embodiment

Figure 10A:
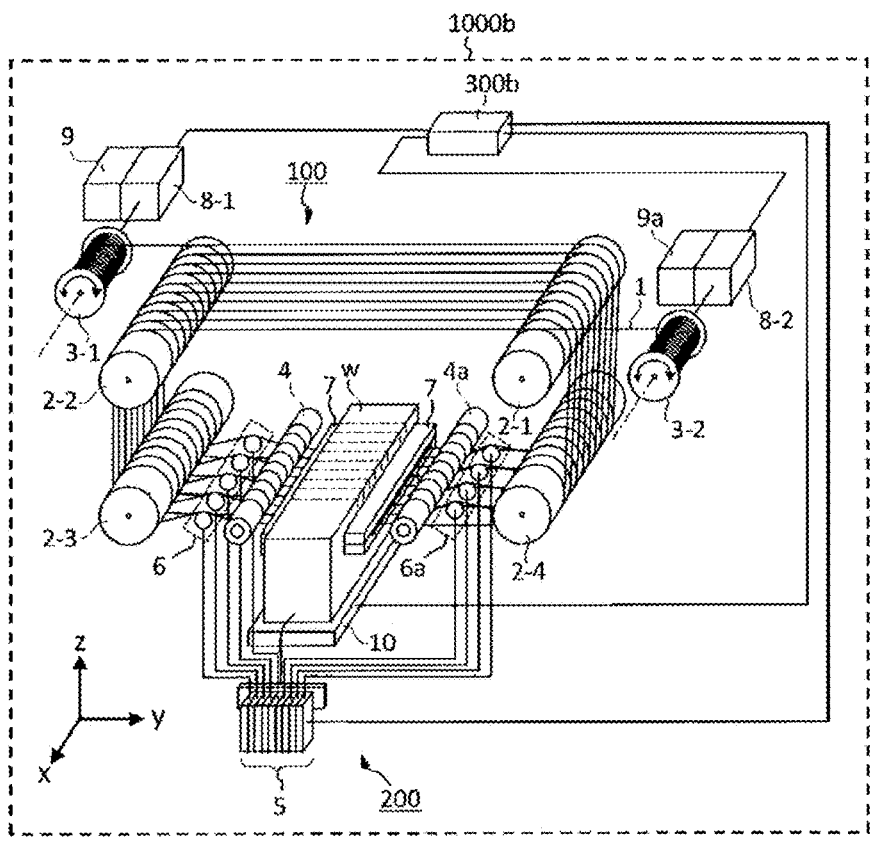
FIG. 10 is a diagram illustrating an exemplary configuration of a wire spark machining apparatus according to a third embodiment.
Figure 10B:
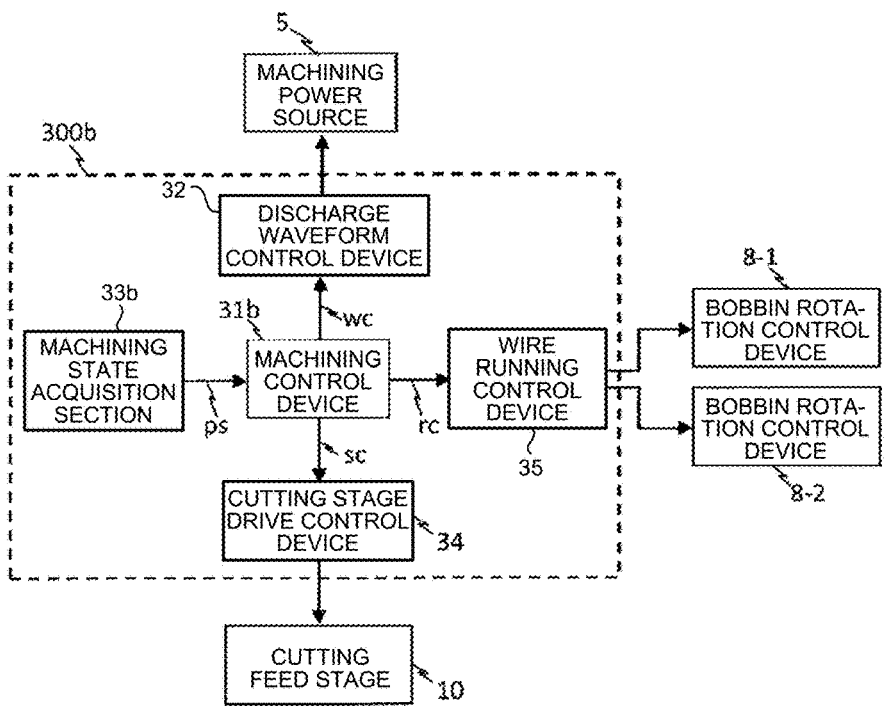
Figure 11:
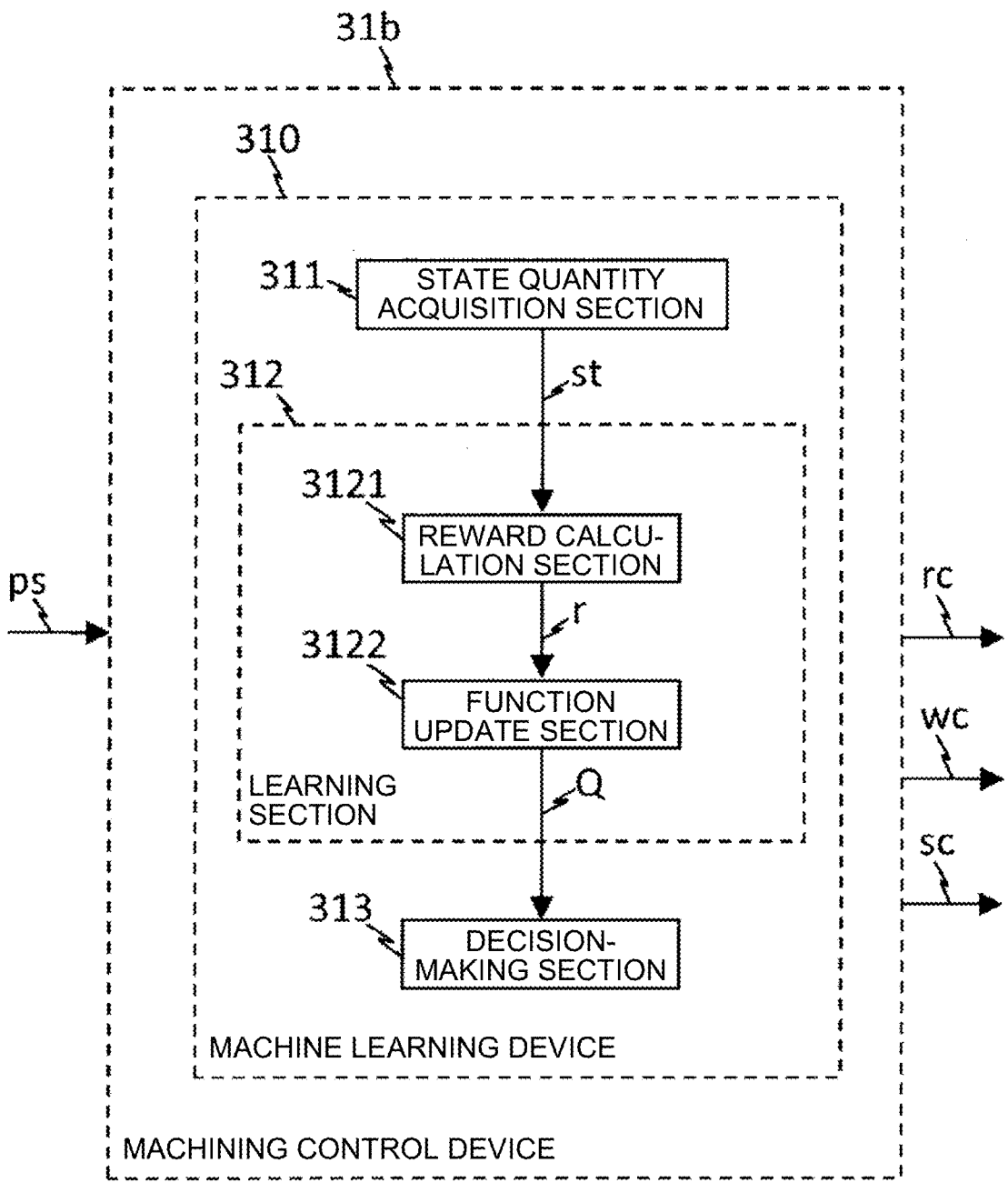
FIG. 11 is a diagram illustrating an exemplary configuration of a machining control device according to the third embodiment.

FIG. 10 is a diagram illustrating an exemplary configuration of a wire spark machining apparatus according to the present embodiment. FIG. 10A illustrates the entire configuration of the wire spark machining apparatus 1000b, and FIG. 10B is a block diagram illustrating the configuration of a control section 300b. The wire spark machining apparatus 1000b according to the present embodiment includes the control section 300b instead of the control section 300 illustrated in FIG. 1 according to the first embodiment. Further, the control section 300b includes a machining control device 31*b* instead of the machining control device 31 illustrated in FIG. 1 according to the first embodiment, and includes a machining state acquisition section 33*b* instead of the machining state acquisition section 33. In the description of the present embodiment, components identical or corresponding to those of the wire spark machining apparatus 1000 described in the first embodiment are denoted by the same reference signs. FIG. 11 is a diagram illustrating an exemplary configuration of the machining control device according to the present embodiment. The machining control device 31*b* illustrated in FIG. 11 includes a state quantity acquisition section 311 that observes a state quantity st, a learning section 312 that executes learning, and a decision-making section 313. The decision-making section 313 determines the wire electrode running command rc, the discharge waveform command wc, the stage command sc, and the like as machining conditions using the result learned by the learning section 312.

The machining state acquisition section 33*b* outputs the machining state information ps including the cutting part electrical characteristic ec-i and/or the electrode state information es-i. The machining control device 31*b* acquires the machining state information ps from the machining state acquisition section 33*b*. The state quantity acquisition section 311 acquires the state quantity st including at least the machining state information ps. The state quantity st is a quantity related to the state of spark machining. Examples of the state quantity st can include a quantity related to the state of the wire spark machining apparatus 1000*b* and a quantity related to the state of the workpiece w. Examples of quantities related to the state of the wire spark machining apparatus 1000*b* can include the wire electrode running command rc, the discharge waveform command wc, the stage command sc, the actual measurement result of the running speed and running direction of the wire electrode 1, and the actual measurement result of the position, speed, acceleration, and the like of the cutting feed stage 10. Examples of quantities related to the state of the workpiece w can include the measurement result of the machining state of the workpiece w, the characteristics of the material of the workpiece w, the size and shape of the workpiece w, the actual measurement result of the machined groove width si, and the plate thickness of cut-out thin plates. Note that the quantities related to the state of the wire spark machining apparatus 1000*b*, the quantities related to the state of the workpiece w, and the like may be acquired in any state: before, during, or after machining.

The learning section 312 executes learning for determining machining conditions for reducing variation in the machined groove width si from the machining state information ps according to a data set created based on the state quantity st. In other words, the learning section 312 executes learning for determining machining conditions for reducing the variation in plate thickness between a plurality of plate-like members to be cut out through multi-wire spark machining from the machining state information ps according to a data set created based on the state quantity st. The learning section 312 may further execute learning for determining machining conditions for more uniformly using each portion of the wire electrode 1 according to a data set created based on the state quantity st. Here, the machining conditions may be, for example, setting conditions for the wire spark machining apparatus 1000*b*, the workpiece w, and the like. In addition, the setting conditions may be changeable or selectable setting conditions. Examples of the machining conditions can include the wire electrode running command rc, the discharge waveform command wc, and the stage command sc.

Hereinafter, an exemplary learning case in which reinforcement learning is applied will be described. In reinforcement learning, an agent (subject of an action) in an environment observes the current state and determines the action to take. The agent gains a reward from the environment by selecting an action, and learns how to maximize the reward through a series of actions. Q-learning and TD-learning are known as representative methods of reinforcement learning. For example, in the case of Q-learning, a general update expression (action value table) for the action value function Q (s, a) is expressed by Formula (1).

[Formula 1]

$$Q(s_t, a_t) \leftarrow Q(s_t, a_t) + a\left(r_{t+1} + \gamma \max_a Q(s_{t+1}, a) - Q(s_t, a_t)\right) \tag{1}$$

In Formula (1), $s_t$ represents the environment at time t, and c represents the action at time t. The action at changes the environment to $s_{t+1}$. In addition, $r_{t+1}$ represents the reward that can be gained due to the change of the environment, $\gamma$ represents a discount rate, and $\alpha$ represents a learning coefficient. Note that $\gamma$ is a value in the range of $0<\gamma\leq1$, and $\alpha$ is a value in the range of $0<\alpha\leq1$. The update expression represented by Formula (1) increases the action value Q when the action value of the best action $a_{t+1}$ at time t+1 is greater than the action value Q of the action $a_t$ executed at time t, and otherwise reduces the action value Q. In other words, the action value function Q (s, a) is updated such that the action value Q of the action $a_t$ at time t is brought closer to the best action value at time t+1. As a result, the best action value in a certain environment sequentially propagates to the action values in the subsequent environments.

A reward calculation section 3121 calculates the reward r based on the state quantity st. A function update section 3122 updates the action value function Q that is a function for determining machining conditions according to the reward r. Here, for example, the reward calculation section 3121 may set the value of the reward r to a value between minus one and plus one. As an example, the reward calculation section 3121 determines in advance a first reference value and a second reference value larger than the first reference value. Next, the plate thickness of the plate-like members cut out collectively under given machining conditions is measured. Then, if the variation in the measured plate thickness is equal to the first reference value or smaller than the first reference value, the reward calculation section 3121 gives plus one as the reward r to the machining conditions. If the variation in the measured plate thickness is a value between the first reference value and the second reference value, zero may be given as the reward r. If the variation in the measured plate thickness is equal to the second reference value or larger than the second reference value, the reward calculation section 3121 may give minus one as the reward r. In addition, the reward calculation section 3121 may have a reward criterion and calculate a reward based on the reward criterion. The reward criterion may be calculated according to a known method. For example, the reward criterion may be calculated based on a reward criterion calculation method.

For example, the reward calculation section 3121 may calculate the reward r based on the generation rate difference d described in the first embodiment. For example, the reward calculation section 3121 may output a large reward r if the generation rate difference d is smaller than a predetermined value, and output a small reward r if the generation rate difference d is equal to the predetermined value or larger than the predetermined value. Such a way of determining the reward r allows the function update section 3122 to update the action value function Q so as to reduce the difference between the machined groove widths si. Thus, the decision-making section 313 can select machining conditions for reducing variation in the machined groove width si. The machine learning device 310 may execute learning for determining machining conditions for reducing variation between the machined groove widths si from the machining state information ps based on the state quantity st. In other words, learning for determining machining conditions for reducing the variation in plate thickness between a plurality of plate-like members to be cut out collectively may be executed.

In addition, for example, the reward calculation section 3121 divides the wire electrode 1 into a plurality of portions. Then, for the wire electrode 1 which has been used for a certain period, the number of times each portion of the wire electrode 1 has passed through any one of the wire cutting parts 1*a-i* is acquired as the number of uses. Then, if the maximum value of the difference in the number of uses between the plurality of portions of the wire electrode 1 exceeds a predetermined value, the reward r may be set to a small value, and if the maximum value of the difference in the number of uses between the plurality of portions does not exceed the predetermined value, the reward r may be set to a large value. Such a way of calculating the reward r allows the function update section 3122 to update the action value function Q so as to reduce the difference in the number of uses between the different portions of the wire electrode 1. Thus, the decision-making section 313 can select machining conditions that reduce the difference in the number of uses between the different portions of the wire electrode 1. In this manner, the machine learning device 310 may execute learning for determining machining conditions for reducing the variation in cumulative usage amount between a plurality of portions of the wire electrode 1 from the machining state information ps based on the state quantity st.

Figure 12:
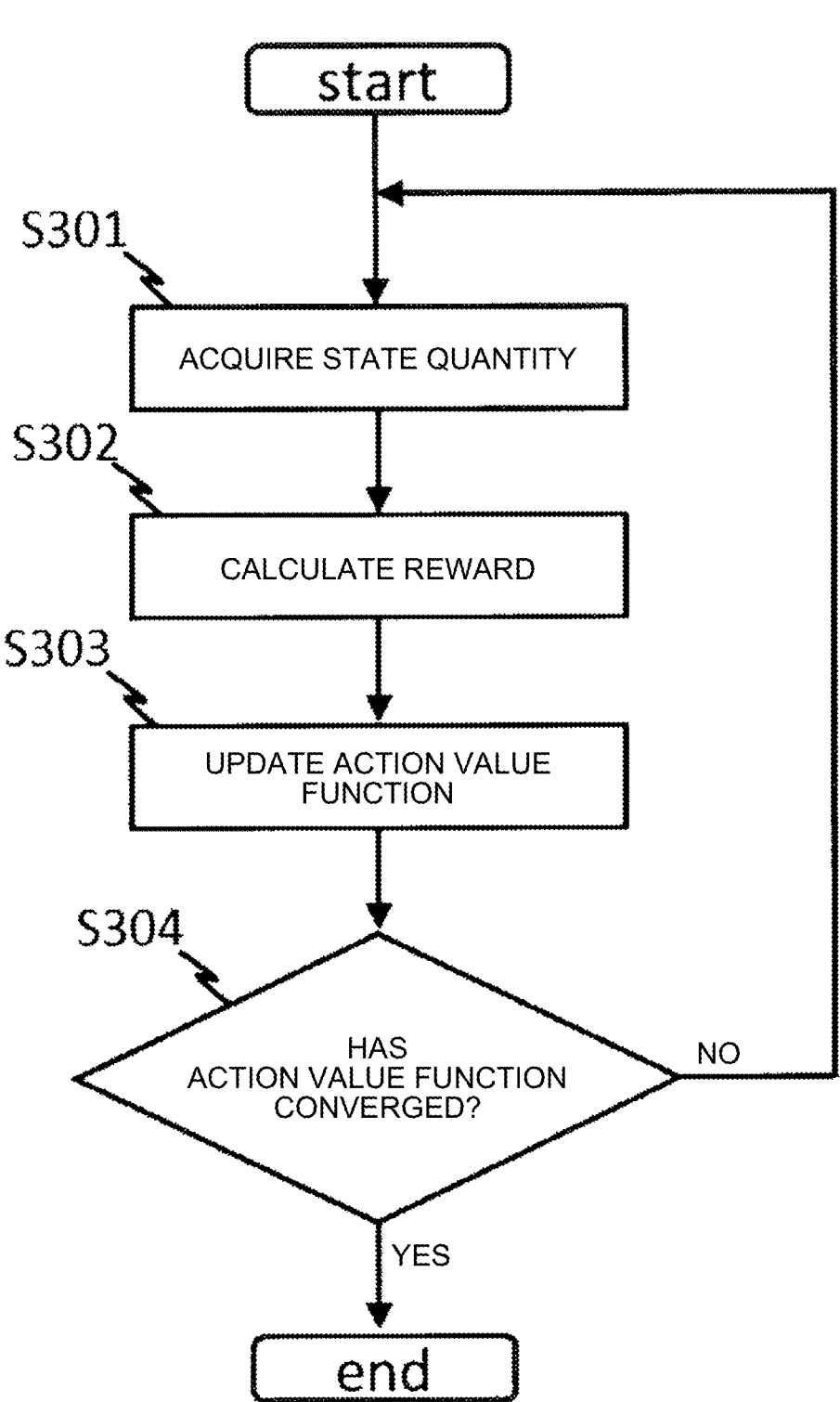
FIG. 12 is a flowchart illustrating an example operation of a machine learning device according to the third embodiment.

FIG. 12 is a flowchart illustrating an example operation of the machine learning device according to the present embodiment. Reinforcement learning for updating the action value function Q ($s_t$, $a_t$) will be described with reference to the flowchart in FIG. 12. In step S301, the state quantity acquisition section 311 acquires the state quantity st. In step S302, the reward calculation section 3121 calculates the reward r based on the state quantity st acquired by the state quantity acquisition section 311. In step S303, the function update section 3122 updates the action value function Q based on the reward r calculated by the reward calculation section 3121. In step S304, the function update section 3122 determines whether the action value function Q has converged. In response to the determination that the action value function Q has converged, the learning section 312 ends the learning. On the other hand, in response to the determination that the action value function Q has not converged, the learning section 312 proceeds to step S301, and repeatedly executes the operation procedure of steps S301 to S304 until it is determined that the action value function Q has converged. For example, the function update section 3122 may determine that the action value function Q has converged if the difference between the action value function Q before update in step S303 and the action value function Q after update is smaller than a predetermined range. Note that step S304 may be replaced with an operation procedure in which the learning section 312 ends the learning after a predetermined number of repetitions of steps S301 to S303.

Note that the example in which reinforcement learning is applied to the learning algorithm described with reference to FIG. 11 is merely one example of the present embodiment. The learning algorithm of the machine learning device 310 used in the present embodiment is not limited to reinforcement learning, and learning algorithms such as supervised learning, unsupervised learning, and semi-supervised learning can also be applied. It is also possible to use deep learning, which learns feature extraction directly. It is also possible to execute machine learning according to another known method, e.g. a neural network, genetic programming, functional logic programming, a support vector machine, or the like. In addition, the machine learning device 310 may be placed either close to or away from the components other than the machine learning device 310 in the wire spark machining apparatus 1000*b*. For example, the machine learning device 310 may be connected by an electric communication line to the components other than the machine learning device 310 in the wire spark machining apparatus 1000*b*. Alternatively, the machine learning device 310 may exist on a cloud server.

In addition, a learned learning machine that has already executed learning with the machine learning device 310 may be applied to a wire spark machining apparatus different from the wire spark machining apparatus on which the learning has been executed. For example, a wire spark machining apparatus different from the wire spark machining apparatus 1000*b* may include the state quantity acquisition section 311 that observes the state quantity st that is a quantity including the machining state information ps and related to the state of spark machining. Further, a learned learning machine may be provided which has executed learning for determining machining conditions for reducing variation in the plate thickness of a plurality of plate-like members to be cut out from the machining state information ps based on the state quantity st. The learned learning machine may be, for example, the decision-making section 313 having the updated action value function Q. By using the learned learning machine, machining can be implemented with small variations in plate thickness between a plurality of plate-like members cut out collectively, without performing new learning in the wire spark machining apparatus equipped with the learned learning machine. In addition, in the machining control device 31*b* of FIG. 11, the machine learning device may be configured by omitting the decision-making section 313 from the machine learning device 310. With this machine learning device, the machining state information ps and the state quantity st may be repeatedly acquired from the outside so that learning is repeatedly executed, and a learned learning machine having the learned results may be configured.

Note that the machine learning device described in the present embodiment can have various configurations. For example, learning may be performed according to a data set including state quantities acquired from a plurality of spark machining apparatuses. During the acquisition of the data set, a wire spark machining apparatus from which the data set is to be acquired may be added to or removed from the list of wire spark machining apparatuses from which the data set is to be acquired. In addition, a machine learning device that has executed learning based on the state quantities acquired from one wire spark machining apparatus may execute additional learning based on the state quantities acquired from another wire spark machining apparatus.

According to the present embodiment, learning for determining machining conditions for reducing variation between the machined groove widths si from the machining state information ps is executed based on the state quantity st. In other words, learning for determining machining conditions for reducing variation in the plate thickness of a plurality of plate-like members to be cut out collectively is executed. Therefore, it is possible to reduce, more quickly and more efficiently using the result of learning, variation in the plate thickness of a plurality of plate-like members to be cut out collectively.

As described above, the wire spark machining apparatus 1000*b* according to the present embodiment can reduce variation in the plate thickness of plate-like members in multi-wire spark machining in which a plurality of plate-like members are collectively cut out from a workpiece.

REFERENCE SIGNS LIST 1 wire electrode; 1*a* parallel wire part; 1*a-i* wire cutting part; 2 plurality of guide rollers; 3 bobbin; 10 cutting feed stage; 31, 31*a*, 31*b* machining control device; 32 discharge waveform control device; 33, 33*a*, 33*b* machining state acquisition section; 34 cutting stage drive control device; 35 wire running control device; 310 machine learning device; 311 state quantity acquisition section; 312 learning section; 1000, 1000*a*, 1000*b* wire spark machining apparatus; lec leading cutting part electrical characteristic; sec subsequent cutting part electrical characteristic; ps machining state information; rc wire electrode running command; sc stage command; w workpiece; we discharge waveform command.

The invention claimed is:

1. A wire spark machining apparatus comprising:
one wire electrode wound at one end around a supply side bobbin and wound at an other end around a collecting side bobbin, the wire electrode being wound multiple times around a plurality of guide rollers at intervals in a direction of a rotation axis of the guide rollers to form a parallel wire part in which a plurality of wire cutters are arranged in parallel;
discharge waveform control circuitry to control, based on a discharge waveform command, an interpolar voltage waveform or an interpolar current waveform between the wire cutters and a workpiece;
wire running control circuitry to control running of the wire electrode based on a wire electrode running command;
cutting stage drive control circuitry to control, based on a stage command, a cutting feed stage that changes a relative position between the parallel wire part and the workpiece;
machining state acquisition circuitry to acquire a cutting part electrical characteristic or electrode state information as machining state information, the cutting part electrical characteristic being a measured electrical characteristic between the wire cutters and the workpiece, the electrode state information being information on a state of the wire cutters; and
machining control circuitry to determine the wire electrode running command, the discharge waveform command, and the stage command based on the machining state information.

2. The wire spark machining apparatus according to claim 1, wherein the cutting part electrical characteristic has a correlation with an interpolar distance of the wire cutters.

3. The wire spark machining apparatus according to claim 2, wherein the machining control circuitry determines a direction in which the wire electrode runs based on a result of comparing between a leading cutting part electrical characteristic and a subsequent cutting part electrical characteristic, the leading cutting part electrical characteristic being the cutting part electrical characteristic of a leading wire cutting part that is one of the wire cutters to which the wire electrode is supplied first in the parallel wire part, the subsequent cutting part electrical characteristic being the cutting part electrical characteristic of a subsequent wire cutting part that is one of the wire cutters to which the wire electrode is supplied second or later in the parallel wire part.

4. The wire spark machining apparatus according to claim 3, wherein the machining control circuitry calculates a result of comparison between the leading cutting part electrical characteristic and the subsequent cutting part electrical characteristic as a quantitative index value, and determines a running direction of the wire electrode based on comparison between the quantitative index value and a predetermined reference value.

5. The wire spark machining apparatus according to claim 1, wherein the electrode state information has a correlation with a usage state of the wire electrode.

6. The wire spark machining apparatus according to claim 5, wherein the machining state acquisition circuitry detects, as the electrode state information, a same-direction continuous running distance that is a distance by which the wire electrode has continuously run in a same direction without changing a running direction, and the machining control circuitry reverses the running direction of the wire electrode when the same-direction continuous running distance exceeds a predetermined value.

7. The wire spark machining apparatus according to claim 1, wherein the machining control circuitry determines based on the electrode state information whether an unused portion of the wire electrode is supplied to the parallel wire part, and the machining control circuitry further executes control of maintaining a direction in which the wire electrode runs in one direction when a used portion of the wire electrode is supplied to the parallel wire part, and of reversing a running direction of the wire electrode based on the electrode state information or the cutting part electrical characteristic when an unused portion of the wire electrode is supplied to the parallel wire part.

8. The wire spark machining apparatus according to claim 1, wherein, in a case of reversing a running direction of the wire electrode, when a cumulative number of uses of a portion of the wire electrode to be supplied to the parallel wire part after the reversing is larger than a cumulative number of uses of a portion of the wire electrode supplied to the parallel wire part before the reversing, the machining control circuitry executes either making a running speed of the wire electrode after the reversing higher than before the reversing or making an interpolar discharge energy per unit time after the reversing lower than before the reversing.

9. The wire spark machining apparatus according to claim 1, wherein the machining control circuitry calculates, based on the electrode state information, a cumulative number of uses of a portion of the wire electrode to be supplied to the parallel wire part, and increases a running speed of the wire electrode as the cumulative number of uses calculated increases.

10. The wire spark machining apparatus according to claim 1, wherein the machining control circuitry includes:

state quantity acquisition circuitry to observe a state quantity that is a quantity related to a state of spark machining and including the machining state information; and learning circuitry to execute learning for determining a machining condition from the machining state information based on the state quantity, the machining condition being for reducing variation in plate thickness of a plurality of plate-like members to be cut out through spark machining.

11. The wire spark machining apparatus according to claim 1, wherein the machining control circuitry includes:

state quantity acquisition circuitry to observe a state quantity that is a quantity related to a state of spark machining and including the machining state information; and a learned learning machine that has executed learning for determining a machining condition from the machining state information based on the state quantity, the machining condition being for reducing variation in plate thickness of a plurality of plate-like members to be cut out through spark machining.

12. A method for producing a semiconductor wafer, the method comprising:

winding one wire electrode at one end around a supply side bobbin and at an other end around a collecting side bobbin;

winding the wire electrode multiple times around a plurality of guide rollers at intervals in a direction of a rotation axis of the guide rollers to form a parallel wire part in which a plurality of wire cutters are arranged in parallel;

acquiring a cutting part electrical characteristic or electrode state information as machining state information, the cutting part electrical characteristic being an electrical characteristic between the wire cutters and a semiconductor ingot, the electrode state information being information on a state of the wire cutters;

determining a wire electrode running command, a discharge waveform command, and a stage command based on the machining state information;

controlling, based on the discharge waveform command, a voltage waveform or a current waveform between the wire cutters and the semiconductor ingot;

controlling running of the wire electrode based on the wire electrode running command;

controlling, based on the stage command, a cutting feed stage that changes a relative position between the parallel wire part and the semiconductor ingot; and cutting out a plurality of semiconductor wafers from the semiconductor ingot.

* * * * *